United States Patent
Sugiyama

(10) Patent No.: US 9,840,147 B2
(45) Date of Patent: Dec. 12, 2017

(54) VEHICLE DISPLAY SYSTEM

(71) Applicant: Yazaki Corporation, Tokyo (JP)

(72) Inventor: Tomohiro Sugiyama, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/429,503

(22) Filed: Feb. 10, 2017

(65) Prior Publication Data

US 2017/0232845 A1 Aug. 17, 2017

(30) Foreign Application Priority Data

Feb. 17, 2016 (JP) ................................ 2016-027869

(51) Int. Cl.
| | |
|---|---|
| *B60K 35/00* | (2006.01) |
| *B60K 37/02* | (2006.01) |
| *F16H 19/04* | (2006.01) |
| *F16H 25/20* | (2006.01) |

(52) U.S. Cl.
CPC ...... *B60K 37/02* (2013.01); *B60K 2350/1072* (2013.01); *B60K 2350/2065* (2013.01); *F16H 19/04* (2013.01); *F16H 25/20* (2013.01); *F16H 2025/2081* (2013.01)

(58) Field of Classification Search
CPC . B60K 35/00; B60K 37/02; B60K 2350/1064
USPC .......................... 248/371, 393, 398, 917, 27.1
See application file for complete search history.

(56) References Cited

U.S. PATENT DOCUMENTS

| | | | | |
|---|---|---|---|---|
| 9,010,268 | B2 * | 4/2015 | Kato | G01D 13/02 116/305 |
| 9,561,722 | B2 * | 2/2017 | Nagasaka | B60K 35/00 |
| 2006/0092001 | A1 | 5/2006 | Yokota et al. | |
| 2007/0040072 | A1 * | 2/2007 | Kageyama | B60K 37/02 248/27.1 |
| 2007/0115107 | A1 | 5/2007 | Kageyama et al. | |

FOREIGN PATENT DOCUMENTS

| | | |
|---|---|---|
| JP | 2006-132950 A | 5/2006 |
| JP | 2007-137261 A | 6/2007 |
| JP | 2008-32515 A | 2/2008 |
| JP | 2009-69040 A | 4/2009 |
| JP | 2009-107463 A | 5/2009 |
| JP | 2009-107482 A | 5/2009 |
| JP | 2010-216855 A | 9/2010 |
| JP | 2011-17723 A | 1/2011 |
| JP | 2013-44618 A | 3/2013 |

* cited by examiner

*Primary Examiner* — Steven Marsh
(74) *Attorney, Agent, or Firm* — Kenealy Vaidya LLP

(57) ABSTRACT

Provided is a vehicle display system that displays information to be displayed such that the information is recognized by a user inside a vehicle interior in an inner region of a frame of a movable body, wherein a guided portion of a guide device includes a second rotating shaft and first and second rotating bodies disposed coaxially with the rotating shaft, rolling contact surfaces rolling along a guide rail being formed thereon.

4 Claims, 17 Drawing Sheets

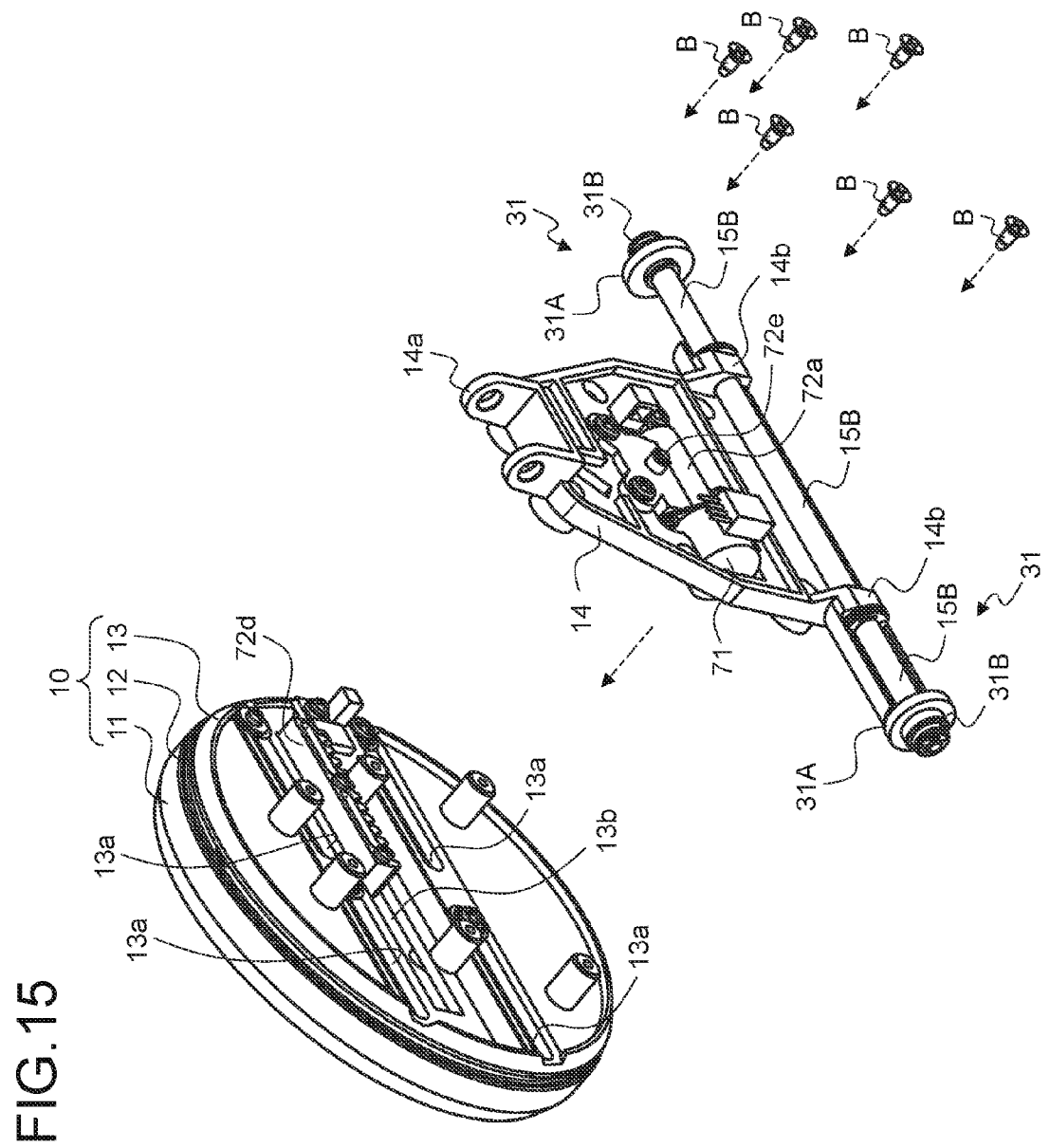

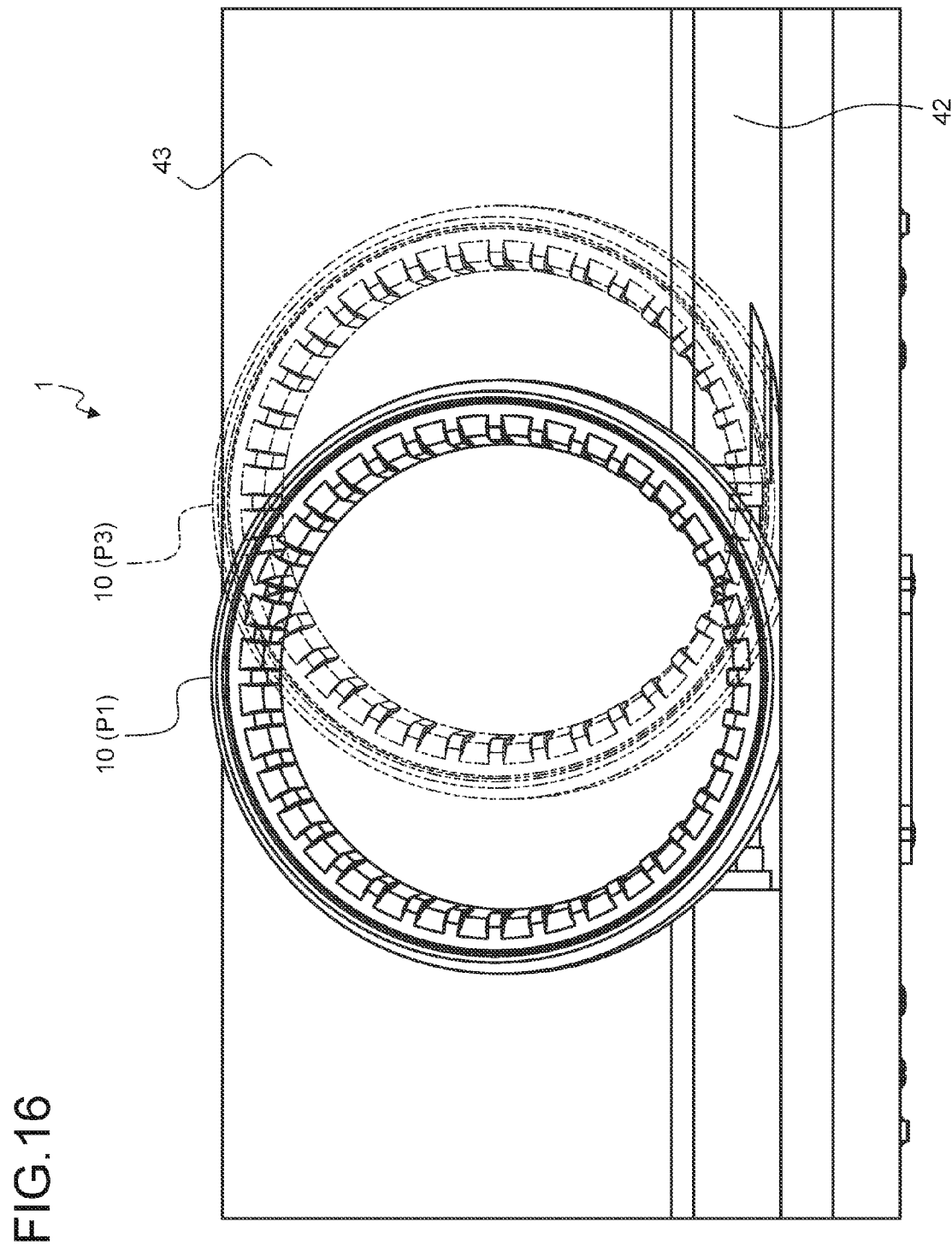

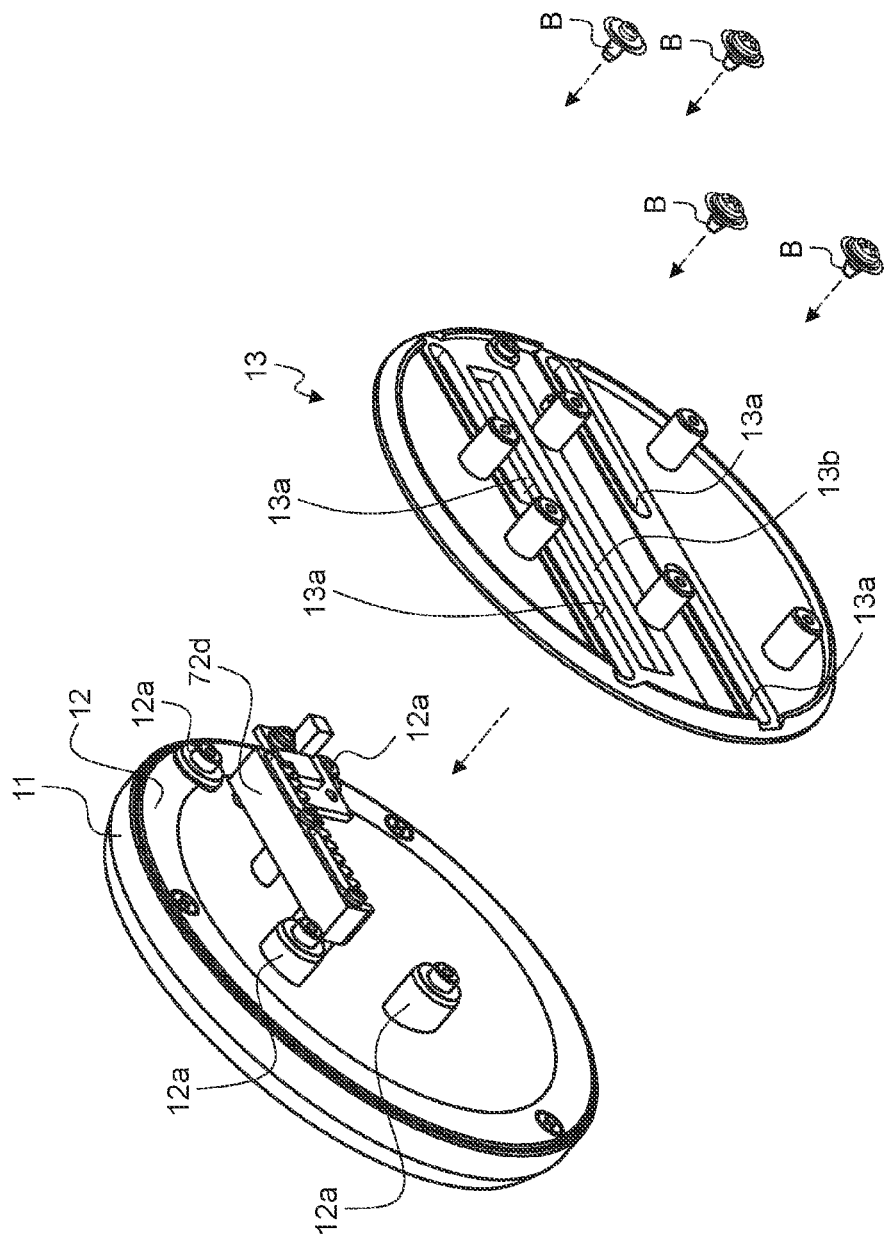

VEHICLE DISPLAY SYSTEM

CROSS-REFERENCE TO RELATED APPLICATION(S)

The present application claims priority to and incorporates by reference the entire contents of Japanese Patent Application No. 2016-027869 filed in Japan on Feb. 17, 2016.

BACKGROUND OF THE INVENTION

1. Field of the Invention

The present invention relates to a vehicle display system.

2. Description of the Related Art

There has been a known vehicle display system that displays information to be displayed such as vehicle information inside a vehicle interior. This vehicle display system mainly displays a vehicle speed, etc. at a position at which the vehicle speed, etc. is recognizable by a driver, and is considered to be in charge of a part of marketability of a vehicle. For example, Japanese Patent Application Laid-open No. 2006-132950, Japanese Patent Application Laid-open No. 2007-137261, Japanese Patent Application Laid-open No. 2008-32515, Japanese Patent Application Laid-open No. 2010-216855, Japanese Patent Application Laid-open No. 2011-17723, and Japanese Patent Application Laid-open No. 2013-44618 disclose a vehicle display system in which an annular member serving as a decorative body is provided to be movable in a vehicle width direction, and content of information to be displayed which is displayed in an inner region of the annular member is changed depending on a position of the annular member in the vehicle width direction. In addition, Japanese Patent Application Laid-open No. 2009-69040, Japanese Patent Application Laid-open No. 2009-107463, and Japanese Patent Application Laid-open No. 2009-107482 disclose a vehicle display system in which an indicator and a substance meter in front of the indicator (on a driver side) are included, and the substance meter is moved depending on information to be displayed which is displayed. In technologies of Japanese Patent Application Laid-open No. 2009-69040 and Japanese Patent Application Laid-open No. 2009-107463, the substance meter is lifted using a wire and stored above the indicator. In a technology of Japanese Patent Application Laid-open No. 2009-107482, the substance meter is stored by falling to a front side of the vehicle using a lower side of the vehicle as a fulcrum.

Incidentally, there is room for improvement in a vehicle display system in terms of improvement in marketability.

SUMMARY OF THE INVENTION

In this regard, an object of the invention is to provide a vehicle display system capable of improving marketability.

In order to achieve the above mentioned object, a vehicle display system according to one aspect of the present invention includes a movable body including a frame having an annular shape or a non-annular shape in which a portion of the annular shape is missing, the frame being allowed to shift between at least two fixed positions corresponding to an upright position in which an inner region of the frame is directed at least to a vehicle rear side and a tilt position in which the inner region is directed to at least a vehicle upper part on a vehicle rear side and a vehicle lower side relative to the upright position; a first holding body that holds one of a vehicle upper side and a vehicle lower side of the movable body in the upright position; a second holding body that holds the other one of the vehicle upper side and the vehicle lower side; a display device that displays information to be displayed such that the information is recognized by a user inside a vehicle interior in the inner region of the frame; a driving device that transmits a driving force at a time of a shift operation of the movable body between the upright position and the tilt position based on power of a power source to the first holding body, the driving force corresponding to a first driving force at a time of shifting the movable body from the upright position to the tilt position and a second driving force at a time of shifting the movable body from the tilt position to the upright position, the second driving force being reverse to the first driving force; and a guide device that guides the shift operation of the movable body between the upright position and the tilt position by guiding a guided portion provided in the second holding body along a guide rail, wherein the guided portion includes a rotating shaft and first and second rotating bodies disposed coaxially with the rotating shaft, rolling contact surfaces rolling along the guide rail being formed on the first and second rotating bodies, the guide rail includes a first guide surface that comes into contact with the rolling contact surface of the first rotating body at one side in a radial direction of the first and second rotating bodies and guides the first rotating body while rolling the first rotating body, and a second guide surface that comes into contact with the rolling contact surface of the second rotating body at the other side in the radial direction and guides the second rotating body while rolling the second rotating body, the first rotating body is disposed to roll while coming into contact with only the first guide surface, and the second rotating body is disposed to roll while coming into contact with only the second guide surface.

According to another aspect of the present invention, in the vehicle display system, it is preferable that the guide rail shifts the movable body from the upright position to the tilt position by guiding the guided portion such that a first held portion of the movable body held by the first holding body moves in a direction of the first driving force when the first driving force acts on the first holding body, and shifts the movable body from the tilt position to the upright position by guiding the guided portion such that the first held portion moves in a direction of the second driving force when the second driving force acts on the first holding body.

According to still another aspect of the present invention, in the vehicle display system, it is preferable that the first rotating body includes a rolling portion having the rolling contact surface, and a gear portion coaxial with the rolling portion, and the guide rail has a rack portion on which a plurality of teeth is formed, the rack portion rolling the first rotating body while meshing with teeth of the gear portion.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 15 is a rear-view exploded perspective view illustrating the second driving device;

FIG. 16 is a front view for description of displacement of the movable body between a first fixed position and a second fixed position; and FIG. 17 is an exploded perspective view for description of a displacement structure between the first fixed position and the second fixed position in the movable body.

DETAILED DESCRIPTION OF THE PREFERRED EMBODIMENTS

Hereinafter, an embodiment of a vehicle display system according to the invention will be described in detail based on drawings. The invention is not restricted by the embodiment.

Embodiment

One embodiment of the vehicle display system according to the invention will be described based on FIG. 1 to FIG. 17.

Figure 1:
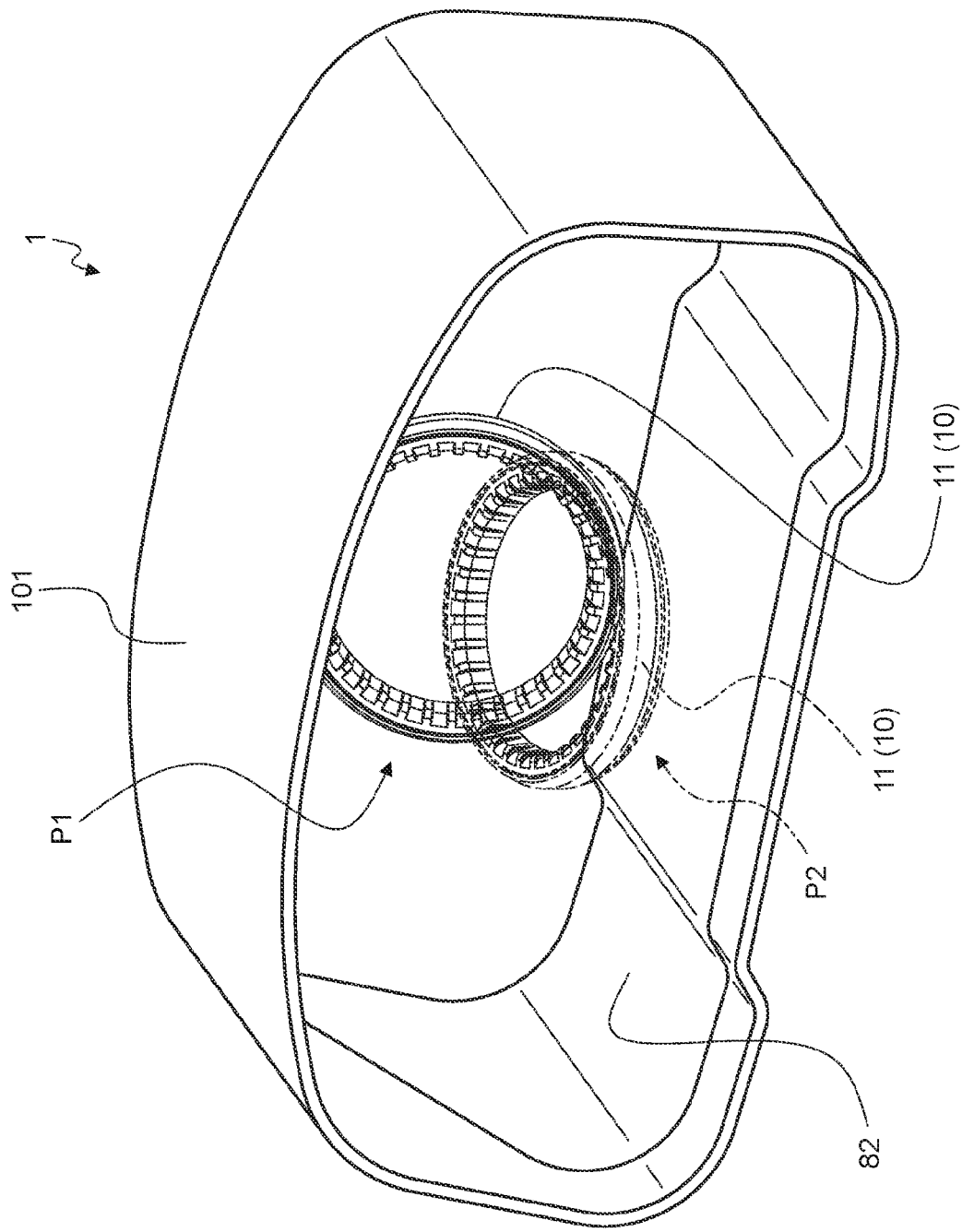
FIG. 1 is a perspective view illustrating an installation state of a vehicle display system of an embodiment inside a vehicle.

Reference numeral 1 of FIG. 1 indicates the vehicle display system of the present embodiment. The vehicle display system 1 is installed inside a vehicle interior of a vehicle to provide information to be displayed to a user inside the vehicle interior by displaying the information to be displayed. The vehicle display system 1 is mainly used as a vehicle meter, and displays vehicle information such as a vehicle speed as information to be displayed. In addition, the vehicle display system 1 may display driving support information (route guidance information of a car navigation system, information of another vehicle obtained by road-vehicle-communication, etc.) that contributes to convenience of a driver as information to be displayed. In the vehicle display system 1, information to be displayed is displayed in an inner region 11a of a frame 11 described below such that the information is recognized by a user inside the vehicle interior. The vehicle display system 1 is disposed at a predetermined position inside the vehicle interior (for example, inside an instrument panel or on a dashboard). In this example, the vehicle display system 1 is accommodated in an accommodation portion 101 of the instrument panel which is present before eyes of the driver.

The vehicle display system 1 of this example includes a movable body 10 which may be shifted between at least two fixed positions (FIG. 1 to FIG. 5). The at least two fixed positions correspond to an upright position P1 illustrated in FIG. 3 (a solid line of FIG. 1 and FIG. 2) and a tilt position P2 illustrated in FIG. 4 (an alternate long and two short dashes line of FIG. 1 and FIG. 2). The upright position P1 refers to a fixed position to which the movable body 10 is shifted such that the inner region 11a of the frame 11 faces the user side inside the vehicle interior. For this reason, in the upright position P1, the frame 11 is erected in a vertical direction of the vehicle such that the inner region 11a is directed to at least a rear of the vehicle (the user side inside the vehicle interior). In this example, a first inclined state in which a vehicle upper side of the erected frame 11 (inner region 11a) is slightly inclined toward a vehicle front side when compared to a vehicle lower side thereof is set to the upright position P1. The tilt position P2 refers to a fixed position in which an inclination toward the vehicle front side is further increased when compared to the upright position P1 to lay down the frame 11 (inner region 11a). For this reason, in the tilt position P2, the frame 11 is laid down such that the inner region 11a is directed at least upward in the vehicle. In this example, a second inclined state in which the vehicle front side of the laid frame 11 (inner region 11a) is slightly raised to the vehicle upper side when compared to a vehicle rear side thereof is set to the tilt position P2.

Figure 5:
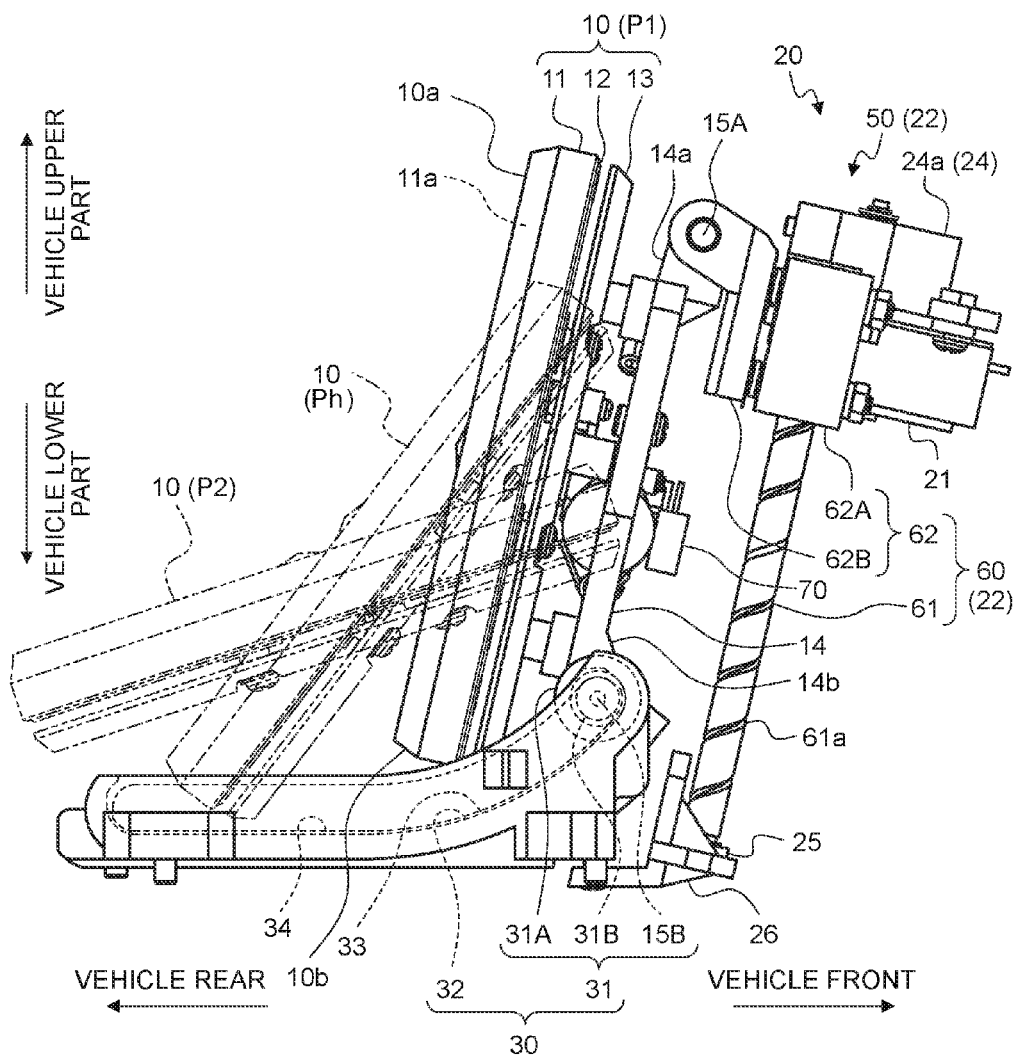
FIG. 5 is a side view for description of displacement of the movable body between the upright position and the tilt position.
Figure 6:
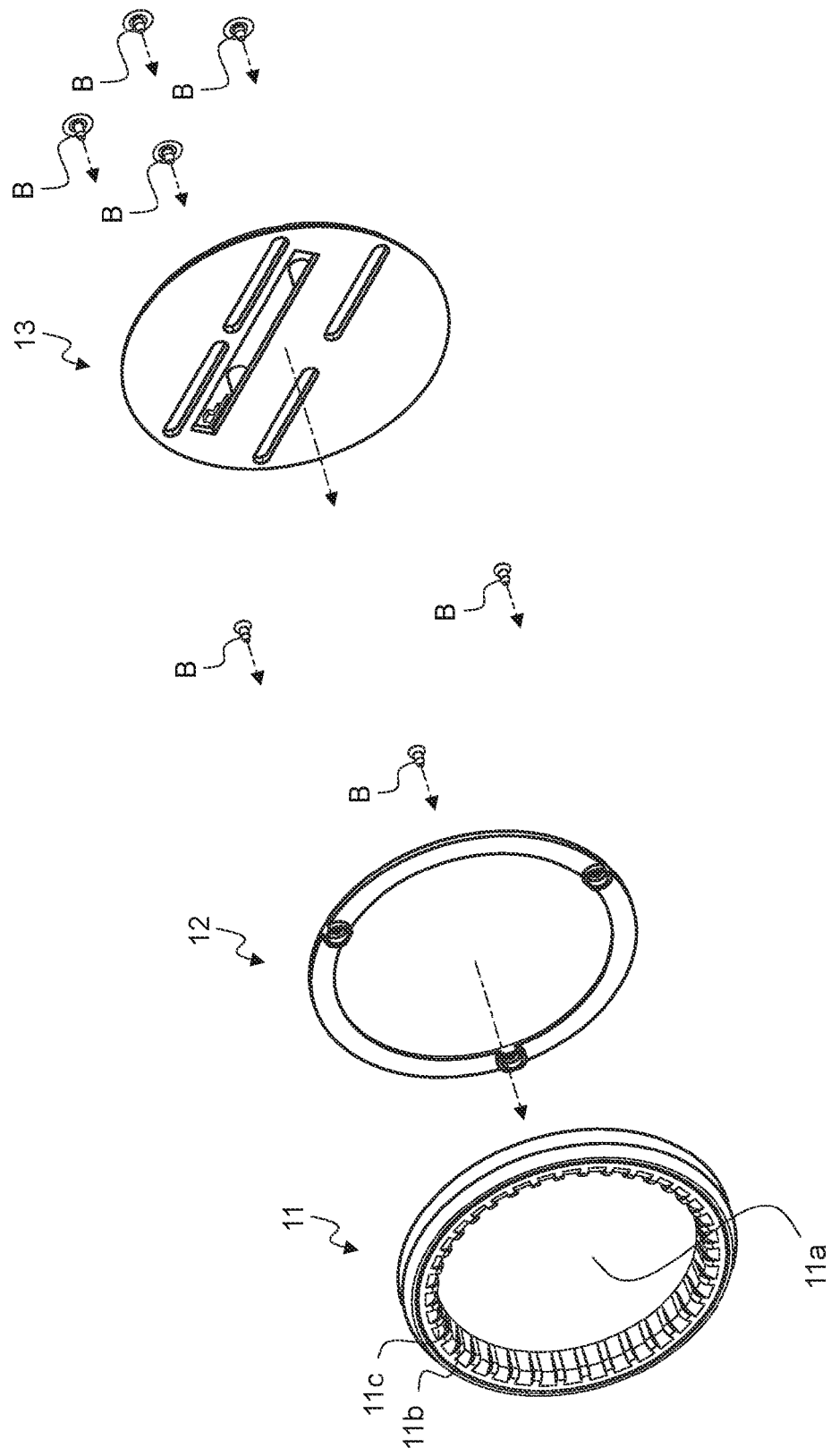
FIG. 6 is an exploded perspective view of the movable body.

The movable body 10 of the present embodiment is in the tilt position P2 when the whole movable body 10 is gradually shifted to the vehicle rear side and the vehicle lower side while a tilt angle of the frame 11 (inner region 11a) with respect to the vertical direction of the vehicle in the upright position P1 is gradually increased (FIG. 5). In addition, the movable body 10 is in the upright position P1 when the whole movable body 10 is gradually shifted to the vehicle front side and the vehicle upper side while the tilt angle of the frame 11 (inner region 11a) with respect to the vertical direction of the vehicle in the tilt position P2 is gradually decreased (FIG. 5). A sign Ph of FIG. 5 indicates a certain position of the movable body 10 in the middle of displacement between the upright position P1 and the tilt position P2.

The movable body 10 includes the frame 11 having an annular shape or a non-annular shape in which a portion of the annular shape is missing, a blocking member 12 that blocks the inner region 11a of the frame 11, and a base member 13 that holds the frame 11 and the blocking member 12 (FIG. 3, FIG. 4, and FIG. 6), and is obtained by integrating the members using a screw member B, etc.

The frame 11 of this example is molded in an annular shape using a synthetic resin material, etc., and a disc-shaped space inside the frame 11 corresponds to the inner region 11a. The frame 11 is used as a decorative member to be recognized by the user. For this reason, for example, the frame 11 is subjected to metal tone processing at a position at which the frame 11 is recognizable by at least the user. In addition, in the frame 11, depressions 11b and projections 11c alternately disposed at equal intervals in a circumferential direction are formed at a front surface side (vehicle rear side in the upright position) and an inner circumferential surface side.

Herein, as described below, a display device 80 of this example forms a virtual image at the front surface side of the frame 11 (the vehicle rear side in the upright position P1 and the vehicle upper side in the tilt position P2), and causes the user to recognize information to be displayed formed by the virtual image as though the information is displayed in the inner region 11a. For this reason, the blocking member 12 is disposed on a rear surface side of the frame 11 such that a mechanism, etc. on the rear surface side of the frame 11 (the vehicle front side in the upright position P1 and the vehicle lower side in the tilt position P2) is not viewed from the inner region 11a, and blocks the inner region 11a from the rear surface. The blocking member 12 of this example is molded using a synthetic resin material having a dark color, etc. to have a shape matched with the disc-shaped inner region 11a. For example, the blocking member 12 is molded in a disc shape to block the inner region 11a using a circular surface exposed to the user side. Alternatively, the blocking member 12 is molded to block the inner region 11a using a cone-shaped curved surface exposed to the user side. The blocking member 12 of this example has a cone-shaped curved surface protruding to the user side.

The base member 13 is disposed on a rear surface side of the blocking member 12 (the vehicle front side in the upright position P1 and the vehicle lower side in the tilt position P2), and is integrated with the frame 11 and the blocking member 12. The base member 13 of this example is molded in a disc shape using a synthetic resin material, etc. corresponding to the shapes of the frame 11 and the blocking member 12.

Hereinafter, for convenience, the vehicle rear side in the upright position P1 and the vehicle upper side in the tilt position P2 of the movable body 10 (the frame 11, the blocking member 12, and the base member 13) will be referred to as a "front surface side", and the vehicle front side in the upright position P1 and the vehicle lower side in the tilt position P2 of the movable body 10 will be referred to as a "rear surface side". In addition, hereinafter, the vehicle upper side in the upright position P1 and the vehicle front side in the tilt position P2 of the movable body 10 will be referred to as an "upper portion", and the vehicle lower side in the upright position P1 and the vehicle rear side in the tilt position P2 of the movable body 10 will be referred to as a "lower portion".

Figure 7:
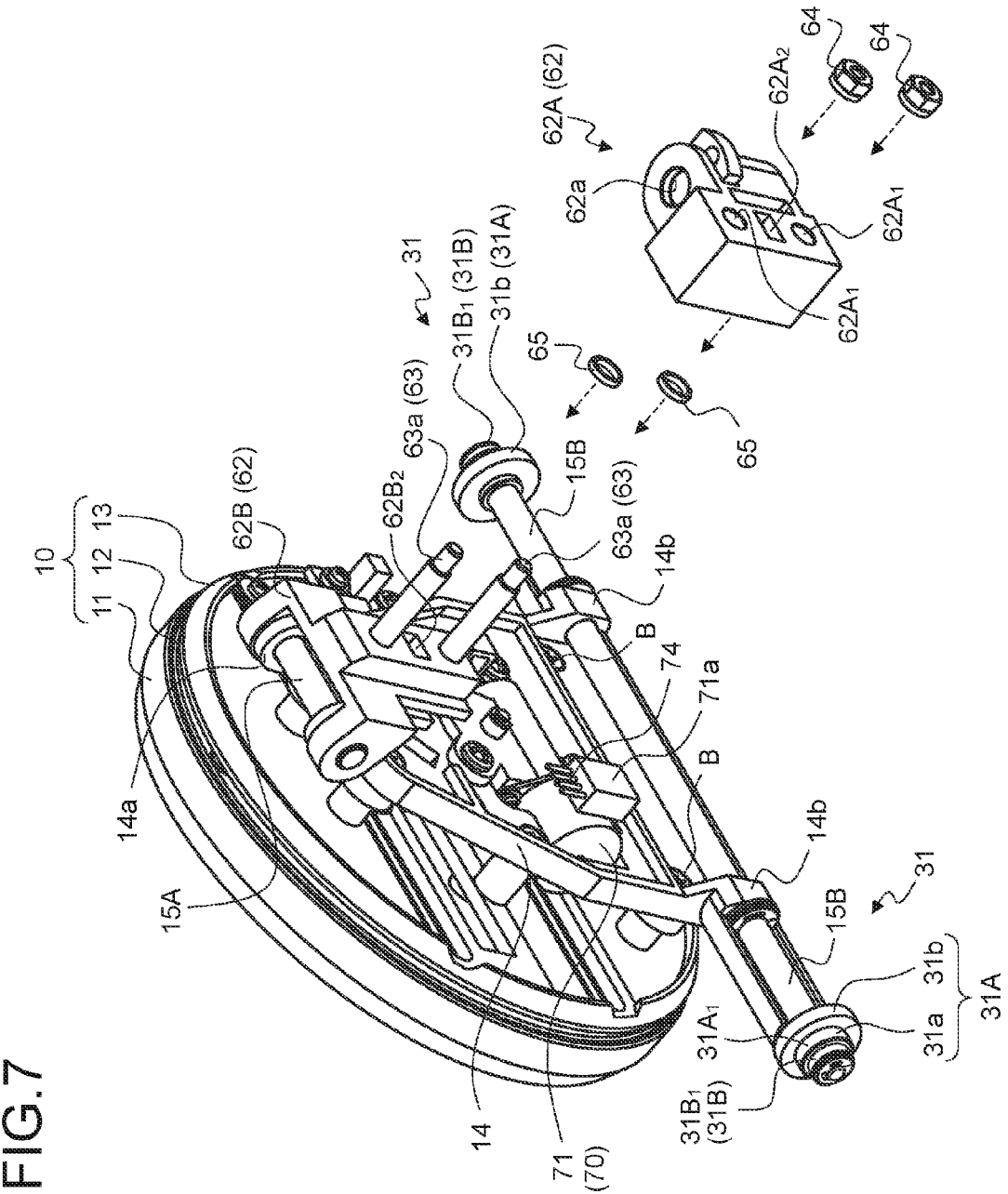
FIG. 7 is an exploded perspective view of a motion direction conversion member illustrated together with the movable body and a holding member.

In the vehicle display system 1, the movable body 10 is held at two points. A first holding body that holds one of the upper portion (first held portion) 10a and the lower portion (second held portion) 10b of the movable body 10, and a second holding body that holds the other one are provided in the vehicle display system 1. Rotating shafts are provided in the first holding body and the second holding body, respectively. The first holding body and the second holding body may be separate bodies or an integrated body. In this example, a holding member 14 obtained by integrally molding the first holding body and the second holding body is provided (FIG. 7). The holding member 14 is molded and disposed to cover a rear surface side of the base member 13 between the upper portion 10a and the lower portion 10b of the movable body 10. The holding member 14 includes a first holding portion 14a corresponding to the first holding body and a second holding portion 14b corresponding to the second holding body. In this example, the first holding portion 14a is allowed to hold the upper portion 10a of the movable body 10, and the second holding portion 14b is allowed to hold the lower portion 10b of the movable body 10. One second holding portion 14b is provided at each of a vehicle left side and a vehicle right side when viewed from the lower portion 10b side of the movable body 10. In addition, in the holding member 14, a first rotating shaft 15A and a second rotating shaft 15B extending in a vehicle width direction are provided in the first holding portion 14a and the second holding portion 14b, respectively. The second rotating shaft 15B is provided for each second holding portion 14b. The first rotating shaft 15A may rotate around an axis integrally with the first holding portion 14a, or relatively rotate around the axis with respect to the first holding portion 14a. In addition, the second rotating shaft 15B may rotate around an axis integrally with the second holding portion 14b, or relatively rotate around the axis with respect to the second holding portion 14b. For example, the holding member 14 is molded using a synthetic resin material, etc. and integrated with the movable body 10 using the screw member B, etc.

Figure 2:
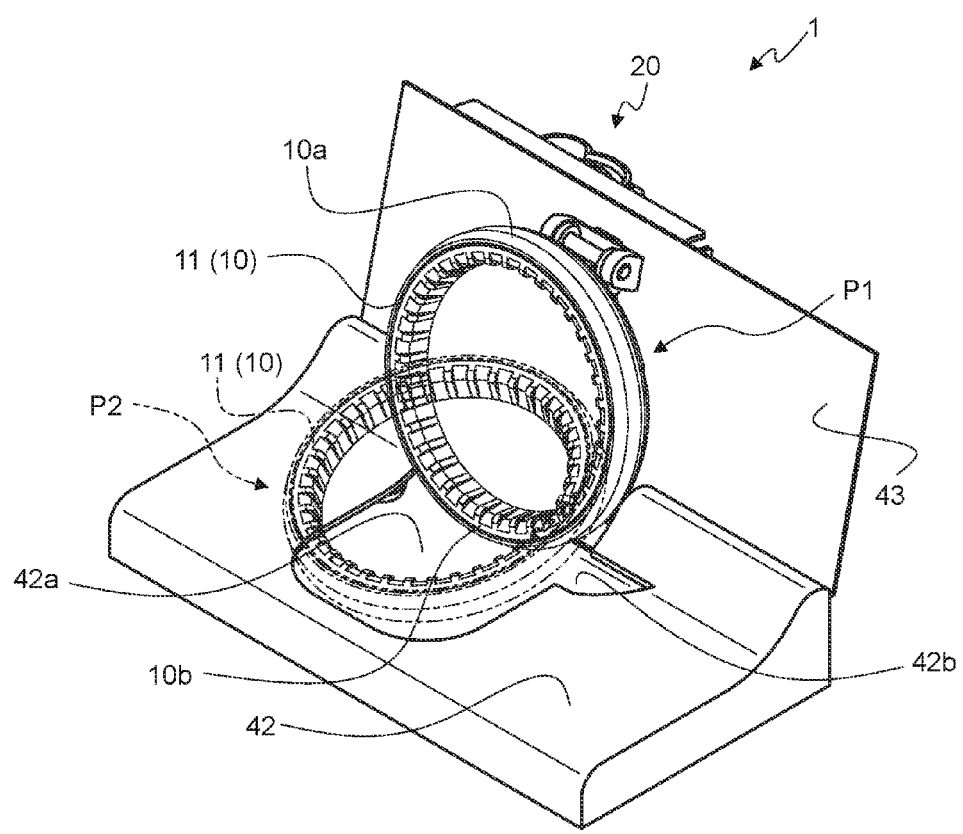
FIG. 2 is a perspective view illustrating the vehicle display system of the embodiment.
Figure 3:
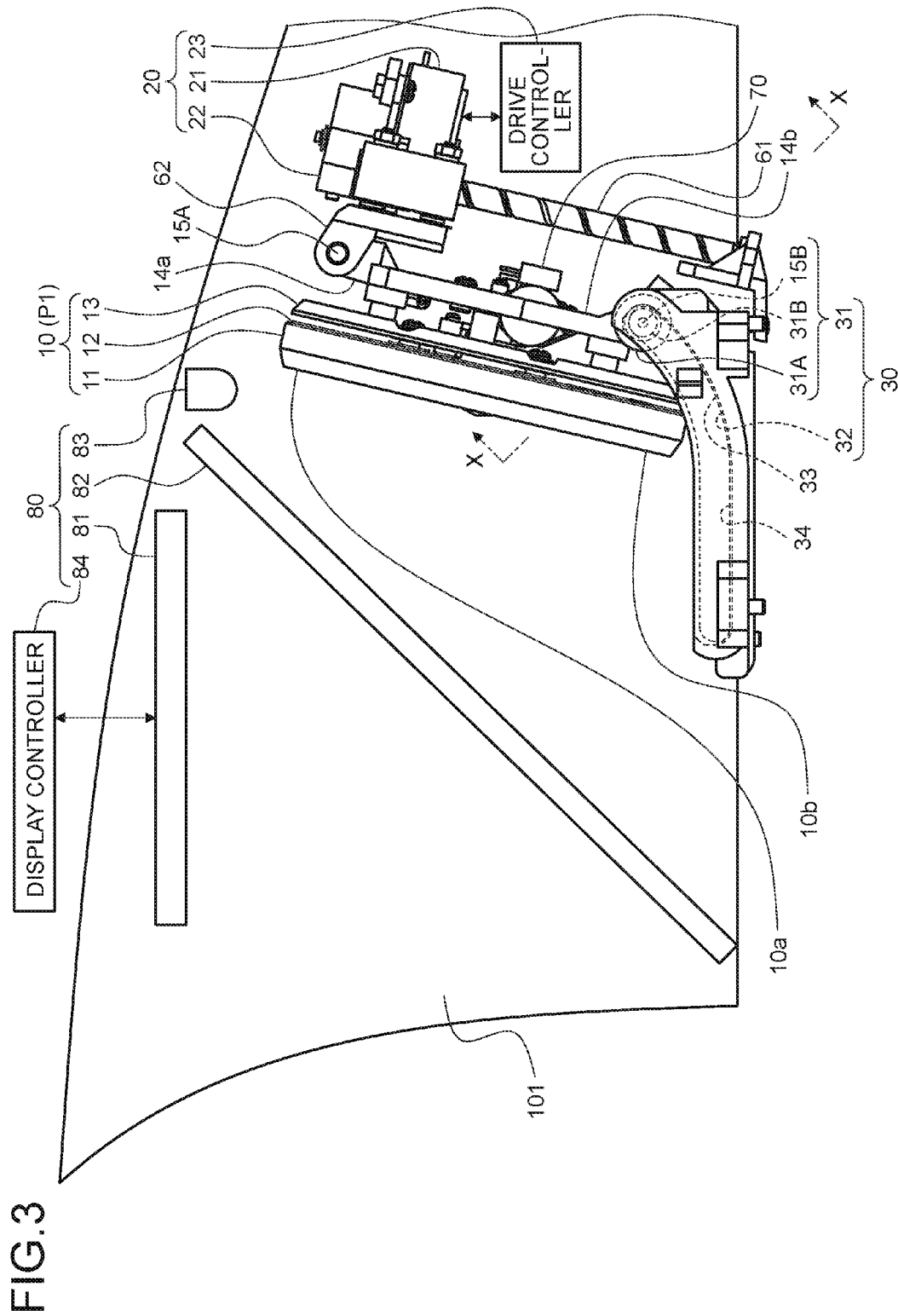
FIG. 3 is a side view illustrating an internal structure of the vehicle display system of the embodiment, and is a diagram illustrating a state in which a movable body is in an upright position.
Figure 4:
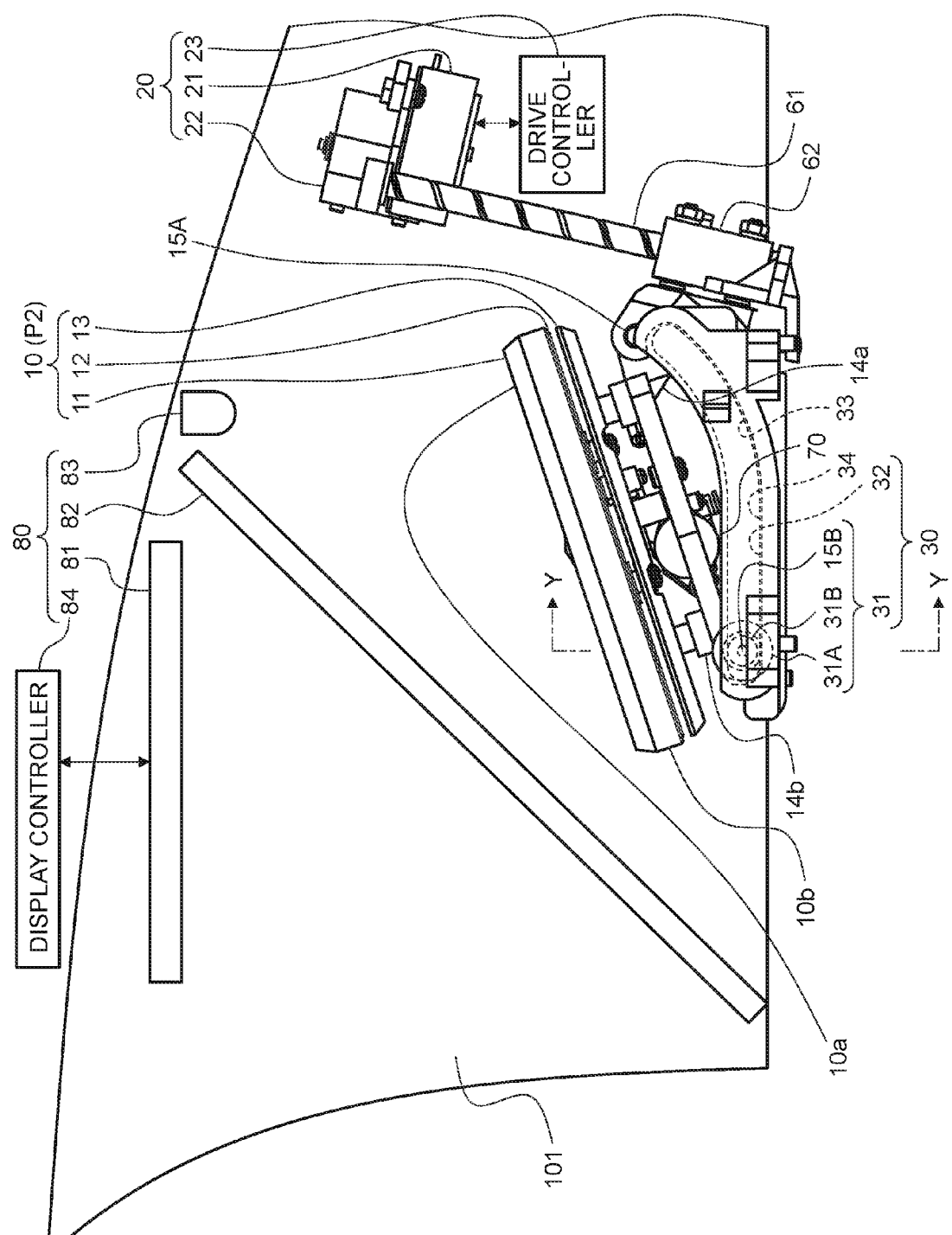
FIG. 4 is a side view illustrating an internal structure of the vehicle display system of the embodiment, and is a diagram illustrating a state in which the movable body is in a tilt position.

The vehicle display system 1 includes a driving device 20 and a guide device 30 in charge of displacement of the movable body 10 (FIG. 3 to FIG. 5). The driving device 20 and the guide device 30 are supported by being attached to a skeleton member 41 of the system (FIG. 8 and FIG. 9), and concealed by a first cover member 42 and a second cover member 43 as much as possible so as not to be recognized by the user (FIG. 2). For example, the skeleton member 41 is molded using a metal material. The skeleton member 41 includes a first support 41a disposed on a rear surface side of the movable body 10 in the upright position P1, and a second support 41b disposed to be divided into two parts in the vehicle width direction on the lower portion 10b side of the movable body 10 in the upright position P1. Referring to the first cover member 42 and the second cover member 43, it is desirable that a shape and disposition be determined such that only the frame 11 and the information to be displayed are recognized through a semitransparent mirror 82 described below irrespective of displacement of the movable body 10. A first notch 42a is provided in the first cover member 42 such that the lower portion 10b of the movable body 10 does not come into contact with the first cover member 42 when the movable body 10 is shifted between the upright position P1 and the tilt position P2. In addition, a second notch 42b is provided in the first cover member 42 such that the lower portion 10b of the movable body 10 does not come into contact with the first cover member 42 when the movable body 10 is shifted in the vehicle width direction as described below.

The driving device 20 includes a power source 21, a power transmission device 22, and a drive controller 23 (FIG. 3 and FIG. 4). The driving device 20 transmits power of the power source 21 to the first holding body (the first holding portion 14a of the holding member 14 in this example) as a driving force at the time of a shift operation between the upright position P1 and the tilt position P2 of the movable body 10. A first driving force at the time of displacement from the upright position P1 to the tilt position P2 and a second driving force, which is reverse to the first driving force, at the time of displacement from the tilt position P2 to the upright position P1 are transmitted as the driving force to the first holding body. The driving device 20 is mainly disposed on the rear surface side of the movable body 10 (the vehicle front side in the upright position P1) and a rear surface side of the skeleton member 41 (the vehicle front side), and attached to the first support 41a of the skeleton member 41.

Figure 8:
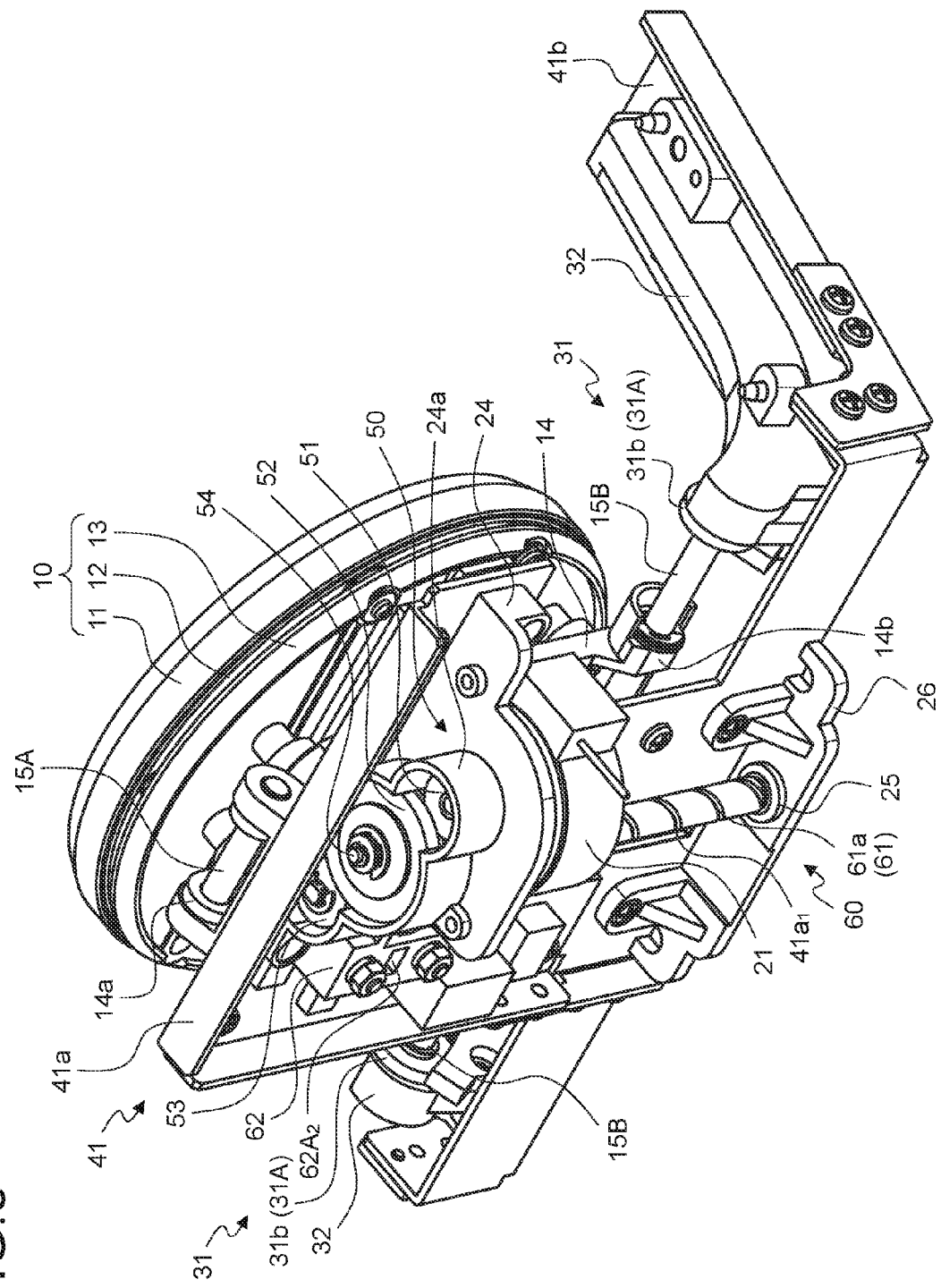
FIG. 8 is a rear-side perspective view illustrating a first driving device and a guide device.
Figure 9:
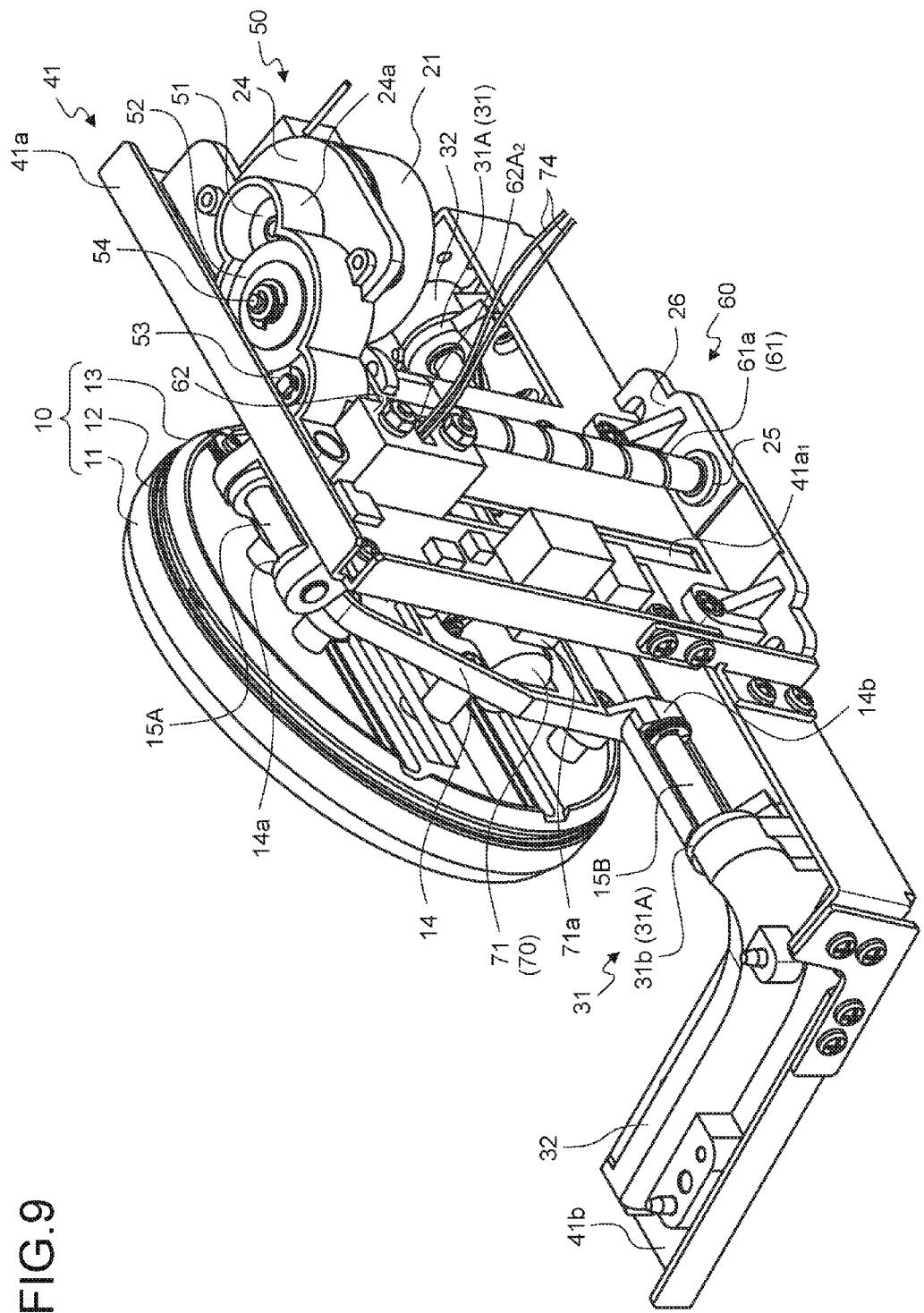
FIG. 9 is a rear-side perspective view illustrating the first driving device and the guide device viewed from another angle.

The power source 21 generates power serving as an origin of a driving force for shifting the movable body 10. In this example, an electric motor is used as the power source 21. The power source 21 is controlled by the drive controller 23. For example, the drive controller 23 controls power output from the power source 21 depending on a target position after a shift of the movable body 10. The power source 21 of this example is held by a first bearing body 24 used as a holding member, and attached to the first support 41a through the first bearing body 24 (FIG. 8 and FIG. 9).

The power transmission device 22 shifts the movable body 10 between the upright position P1 and the tilt position P2 when power of the power source 21 is transmitted. For this reason, the power transmission device 22 converts power transmitted from the power source 21 into a driving force and delivers the converted driving force to the movable body 10. The power transmission device 22 of this example is held by the first bearing body 24, and attached to the first support 41a through the first bearing body 24. The power transmission device 22 includes a first power transmission mechanism 50 and a second power transmission mechanism 60 (FIG. 5).

The first power transmission mechanism 50 includes first to third gears 51 to 53 (FIG. 8 and FIG. 9), and transmits power (output torque) of the power source 21 to the second power transmission mechanism 60 through the first to third gears 51 to 53. Spur gears are used as the first to third gears 51 to 53 of this example. The first gear 51 is coaxially attached to an output shaft (not illustrated) of the power source 21, and rotates integrally with the output shaft. The second gear 52 is coaxially attached to a rotating shaft 54, and rotates integrally with the rotating shaft 54. The rotating shaft 54 is disposed parallel to the output shaft of the power source 21 with an interval therebetween such that axial lines thereof are directed in the same direction. The second gear 52 is meshed with the first gear 51. The third gear 53 has a central axis of rotation parallel to the output shaft of the power source 21 or the rotating shaft 54, and is meshed with the second gear 52. Bearings (not illustrated) that rotatably hold the rotating shaft 54 of the second gear 52 and a rotating shaft of the third gear 53 (a shaft member 61 described below of the second power transmission mechanism 60), respectively, are provided in the first power transmission mechanism 50 to smoothen rotation of the second gear 52 and the third gear 53. The respective bearings and the first to third gears 51 to 53 are accommodated in an accommodation portion 24a provided in the first bearing body 24. Therefore, the first power transmission mechanism 50 is attached to the first support 41a of the skeleton member 41 through the first bearing body 24.

Herein, the shaft member 61 is coaxially disposed on the central axis of rotation of the third gear 53. The third gear 53 rotates integrally with the shaft member 61. Therefore, in the first power transmission mechanism 50, when power (output torque) of the power source 21 is transmitted to the shaft member 61 through the first to third gears 51 to 53, the power is transmitted to the second power transmission mechanism 60.

The second power transmission mechanism 60 is a motion direction conversion mechanism that converts a rotary torque around a shift into power along an axis direction and delivers the converted rotary torque. The second power transmission mechanism 60 of this example includes the shaft member 61 and a motion direction conversion member 62 that may reciprocate along an axis direction on the shaft member 61 in association with rotation around an axis of the shaft member 61 (FIG. 5, FIG. 8, and FIG. 9). Specifically, the second power transmission mechanism 60 is configured as a so-called feed screw mechanism.

The shaft member 61 is disposed parallel to the output shaft of the power source 21 or the rotating shaft 54 with an interval therebetween such that axial lines thereof are directed in the same direction, and rotates around an axis by interlocking with rotation of the third gear 53 which is coaxially disposed. In other words, the shaft member 61 may rotate around the axis using power of the power source 21. As described in the foregoing, one end portion side (third gear 53 side) of the shaft member 61 is rotatably held by a bearing inside the accommodation portion 24a. Further, the other end portion side of the shaft member 61 is rotatably held by a bearing 25. The bearing 25 is accommodated in a second bearing body 26, and attached to the first support 41a of the skeleton member 41 through the second bearing body 26. Therefore, the second power transmission mechanism 60 is attached to the first support 41a through the first and second bearing bodies 24 and 26. For example, the shaft member 61 is molded in a cylindrical shape or a columnar shape using a metal material, and has a male screw portion 61a threaded along an axis direction on an outer circumferential surface thereof.

The motion direction conversion member 62 has a female screw portion 62a screwed with the male screw portion 61a (FIG. 7). The motion direction conversion member 62 of this example is largely divided into a first motion direction conversion member 62A and a second motion direction conversion member 62B (FIG. 5 and FIG. 7). For example, the first motion direction conversion member 62A is integrated by insert molding of a synthetic resin material and the female screw portion 62a made of a metal material, and is disposed on a rear surface side (vehicle front side) of the first support 41a of the skeleton member 41. For this reason, the first motion direction conversion member 62A is rotatably held with respect to the shaft member 61 while the male screw portion 61a is screwed with the female screw portion 62a. Meanwhile, the second motion direction conversion member 62B is molded using a synthetic resin material, and disposed on a front surface side (vehicle rear side) of the first support 41a. The second motion direction conversion member 62B is rotatably connected to the first holding portion 14a of the holding member 14 through the first rotating shaft 15A. For this reason, the movable body 10 and the second motion direction conversion member 62B may relatively rotate using the first rotating shaft 15A as a central axis of rotation.

The first motion direction conversion member 62A and the second motion direction conversion member 62B are integrated with each other, and connected to the movable body 10 through the holding member 14. Herein, the first support 41a of the skeleton member 41 has a plane parallel to both the vehicle width direction and a direction of an axial line of the shaft member 61, and has a through-hole $41a_1$ extending in the same direction as the direction of the axial line of the shaft member 61 in a portion of the plane (FIG. 8 and FIG. 9). The first motion direction conversion member 62A and the second motion direction conversion member 62B are disposed to interpose the through-hole $41a_1$ therebetween, and integrated to be able to reciprocate along an extending direction of the through-hole $41a_1$. For example, two cylindrical or columnar shaft members 63 protruding toward the first motion direction conversion member 62A are provided on the second motion direction conversion member 62B (FIG. 7). The respective shaft members 63 are inserted into the through-hole $41a_1$ while being arranged along the extending direction of the through-hole $41a_1$.

Cylindrical through-holes $62A_1$ into which the respective shaft members 63 are inserted are formed in the first motion direction conversion member 62A. The first motion direction conversion member 62A and the second motion direction conversion member 62B are integrated with each other when the shaft members 63 inserted into the through-hole $41a_1$ are inserted into the through-holes $62A_1$, and female screw members 64 are fastened to male screw portions 63a provided at distal ends of the shaft members 63.

Annular collar members 65, into which the shaft members 63 are inserted and which are inserted into the through-hole $41a_1$, are interposed between the first motion direction conversion member 62A and the second motion direction conversion member 62B for the respective shaft members 63. A length of the collar member 65 in the axis direction is longer than a plate thickness of the plane portion of the first support 41a (that is, thickness of the through-hole $41a_1$). For this reason, the first motion direction conversion member 62A and the second motion direction conversion member 62B may freely reciprocate along the through-hole $41a_1$ since the plane portion of the first support 41a is not interposed therebetween when the first motion direction conversion member 62A and the second motion direction conversion member 62B are integrated with each other.

Herein, a diameter of the collar member 65 is equivalent to a width of the through-hole $41a_1$ in a short direction (a direction perpendicular to the extending direction), and is slightly smaller than the width. For this reason, since the collar members 65 are locked by the through-hole $41a_1$, and rotation of the female screw portion 62a around an axis with respect to the shaft member 61 is regulated, the motion direction conversion member 62 (the first motion direction conversion member 62A and the second motion direction conversion member 62B) may move along the axis direction of the shaft member 61 while rotation around the axis of the female screw portion 62a is regulated when the shaft member 61 rotates around the axis. Therefore, when power of the power source 21 is transmitted, the second power transmission mechanism 60 delivers a driving force along the axis direction of the shaft member 61 (that is, movement direction of the motion direction conversion member 62) to the first holding portion 14a of the holding member 14 through the first rotating shaft 15A. Therefore, when power of the power source 21 is controlled to shift the movable body 10 from the upright position P1 to the tilt position P2 when the movable body 10 is in the upright position P1, the driving device 20 delivers a first driving force along a movement direction of the motion direction conversion member 62 from the vehicle upper side to the vehicle lower side to the first holding portion 14a of the holding member 14, and allows a force depending on the first driving force to act on the upper portion 10a of the movable body 10. In addition, when power of the power source 21 is controlled to shift the movable body 10 from the tilt position P2 to the upright position P1 when the movable body 10 is in the tilt position P2, the driving device 20 delivers a second driving force along a movement direction of the motion direction conversion member 62 from the vehicle lower side to the vehicle upper side to the first holding portion 14a of the holding member 14, and allows a force depending on the second driving force to act on the upper portion 10a of the movable body 10.

The guide device 30 guides a shift operation of the movable body 10 between the upright position P1 and the tilt position P2. The guide device 30 includes a guided portion 31 and a guide rail 32 that guides the guided portion 31. In the guide device 30, a guide to the shift operation is performed by guiding the guided portion 31 provided in the second holding body (the second holding portion 14b of the holding member 14 in this example) along the guide rail 32 (FIG. 8 and FIG. 9). The guided portion 31 and the guide rail 32 are provided for each second holding portion 14b. For this reason, in the guide device 30, one combination of the guided portion 31 and the guide rail 32 is provided on each of the vehicle left side and the vehicle right side when viewed from the lower portion 10b side of the movable body 10.

The guided portion 31 of this example includes the second rotating shaft 15B provided in the second holding portion 14b and two rotating bodies (first and second rotating bodies 31A and 31B) provided on the second rotating shaft 15B (FIG. 7). For example, the second rotating shaft 15B is molded in a cylindrical shape or a columnar shape using a metal material. The first rotating body 31A and the second rotating body 31B are coaxially arranged side by side at each of end portions of the second rotating shaft 15B. The first rotating body 31A and the second rotating body 31B may rotate around an axis integrally with the second rotating shaft 15B, or relatively rotate around the axis with respect to the second rotating shaft 15B.

Specifically, rolling contact surfaces $31A_1$ and $31B_1$ that roll along the guide rail 32 are formed on the first rotating body 31A and the second rotating body 31B, respectively. The first rotating body 31A has a rolling portion 31a molded in a disc shape or an annular shape, and uses an outer circumferential surface of the rolling portion 31a as the rolling contact surface $31A_1$. The first rotating body 31A may correspond to the rolling portion 31a. However, in this example, the first rotating body 31A further has a gear portion 31b. For example, the gear portion 31b is a spur gear provided with a plurality of teeth at equal intervals along an outer circumference, is disposed coaxially with the rolling portion 31a, and rotates integrally with the rolling portion 31a. For convenience, the teeth of the gear portion 31b are not illustrated in figures except for FIG. 13. The second rotating body 31B is a member molded in a disc shape or an annular shape, and uses an outer circumferential surface thereof as the rolling contact surface $31B_1$. In this example, the second rotating body 31B is disposed on a vehicle lateral side of the first rotating body 31A when viewed from the lower portion 10b side of the movable body 10. In addition, in the first rotating body 31A of this example, the rolling portion 31a is disposed on the vehicle lateral side of the gear portion 31b when viewed from the lower portion 10b side of the movable body 10. In this example, an outer diameter of the second rotating body 31B is set to be smaller than an outer diameter of the rolling portion 31a.

The guide rail 32 is formed to shift the movable body 10 from the upright position P1 to the tilt position P2 by guiding the guided portion 31 on the lower portion 10b side of the movable body 10 such that the upper portion 10a of the movable body 10 moves in a direction of the first driving force when the first driving force acts on the first holding portion 14a of the holding member 14. Further, the guide rail 32 is formed to shift the movable body 10 from the tilt position P2 to the upright position P1 by guiding the guided portion 31 on the lower portion 10b side of the movable body 10 such that the upper portion 10a of the movable body 10 moves in a direction of the second driving force when the second driving force acts on the first holding portion 14a.

The guide rail 32 is a member extended toward a rear of the vehicle from the lower portion 10b side of the movable body 10 in the upright position P1, and guides the guided portion 31 along an extending direction thereof. Each of guide rails 32 is attached to the second support 41b of the skeleton member 41 disposed in a lower part of the vehicle.

The guide rail 32 has an arc-shaped guide portion 33 formed in an arc shape along the extending direction thereof and a linear guide portion 34 formed on a straight line along the extending direction (FIG. 3 and FIG. 4). In the guide rail 32, the arc-shaped guide portion 33 is disposed on the driving device 20 side, and the linear guide portion 34 is disposed on the vehicle rear side of the arc-shaped guide portion 33. In other words, the arc-shaped guide portion 33 is a part that guides the guided portion 31 at the time of initial application of the first driving force. In addition, the arc-shaped guide portion 33 is a part that guides the guided portion 31 at the time of final application of the second driving force. The arc-shaped guide portion 33 guides the guided portion 31 in a direction of a driving force along an arc shape of the arc-shaped guide portion 33. The arc-shaped guide portion 33 of this example forms an arc shape in which a position changes downward in the vehicle as the position is directed toward the rear of the vehicle. Meanwhile, the linear guide portion 34 is a part that guides the guided portion 31 after initial application of the first driving force. In addition, the linear guide portion 34 is a part that guides the guided portion 31 until final application of the second driving force. The linear guide portion 34 guides the guided portion 31 in a direction of a driving force along a linear shape of the linear guide portion 34. The linear guide portion 34 of this example is extended in a front-rear direction of the vehicle.

Herein, the time of initial application of the first driving force refers to a first application period after the first driving force starts to act on the movable body 10 in the upright position P1. The phrase "after initial application of the first driving force" refers to a last application period after the first application period of the first driving force with respect to the movable body 10 passes until application of the first driving force ends. The time of final application of the second driving force refers to a last application period until application of the second driving force ends when the movable body 10 is shifted from the tilt position P2 to the upright position P1. In other words, when a first application period after the second driving force starts to act on the movable body 10 in the tilt position P2 is set to the time of initial application of the second driving force, the time of final application of the second driving force refers to a last application period after the first application period of the second driving force with respect to the movable body 10 passes until application of the second driving force ends. Herein, the time of initial application of the second driving force corresponds to a period until the time of final application of the second driving force.

Figure 10:
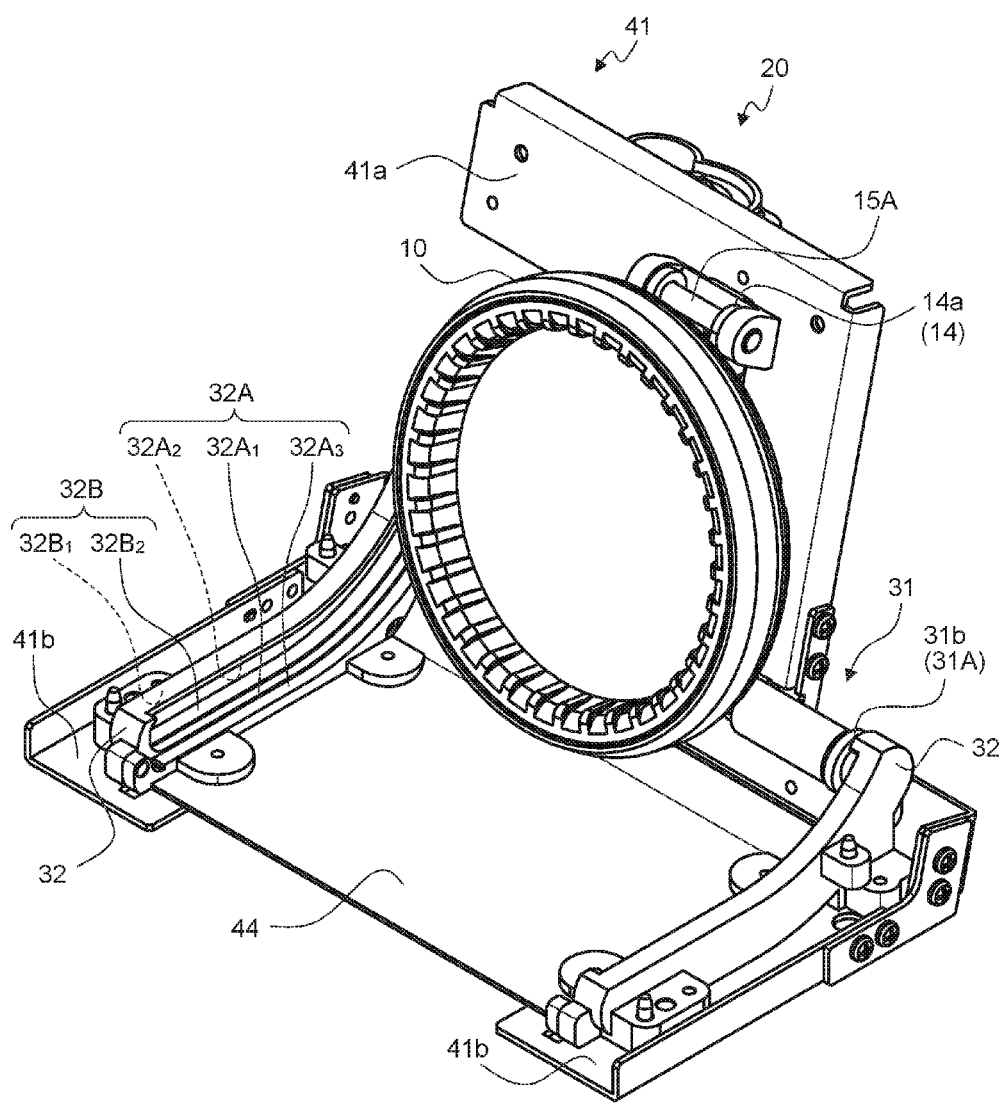
FIG. 10 is a front-side perspective view illustrating the guide device.
Figure 11:
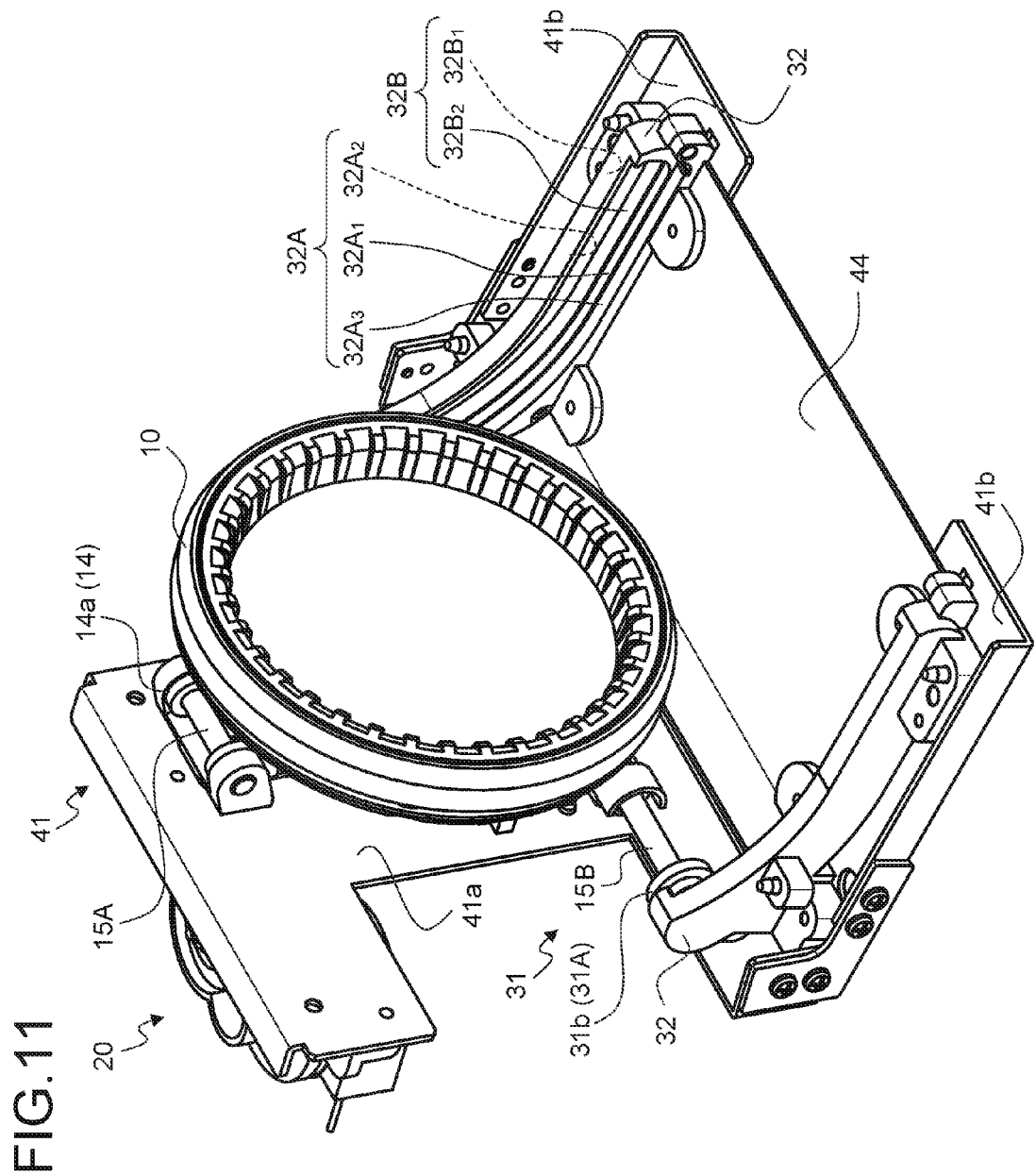
FIG. 11 is a front-side perspective view illustrating the guide device viewed from another angle.
Figure 12:
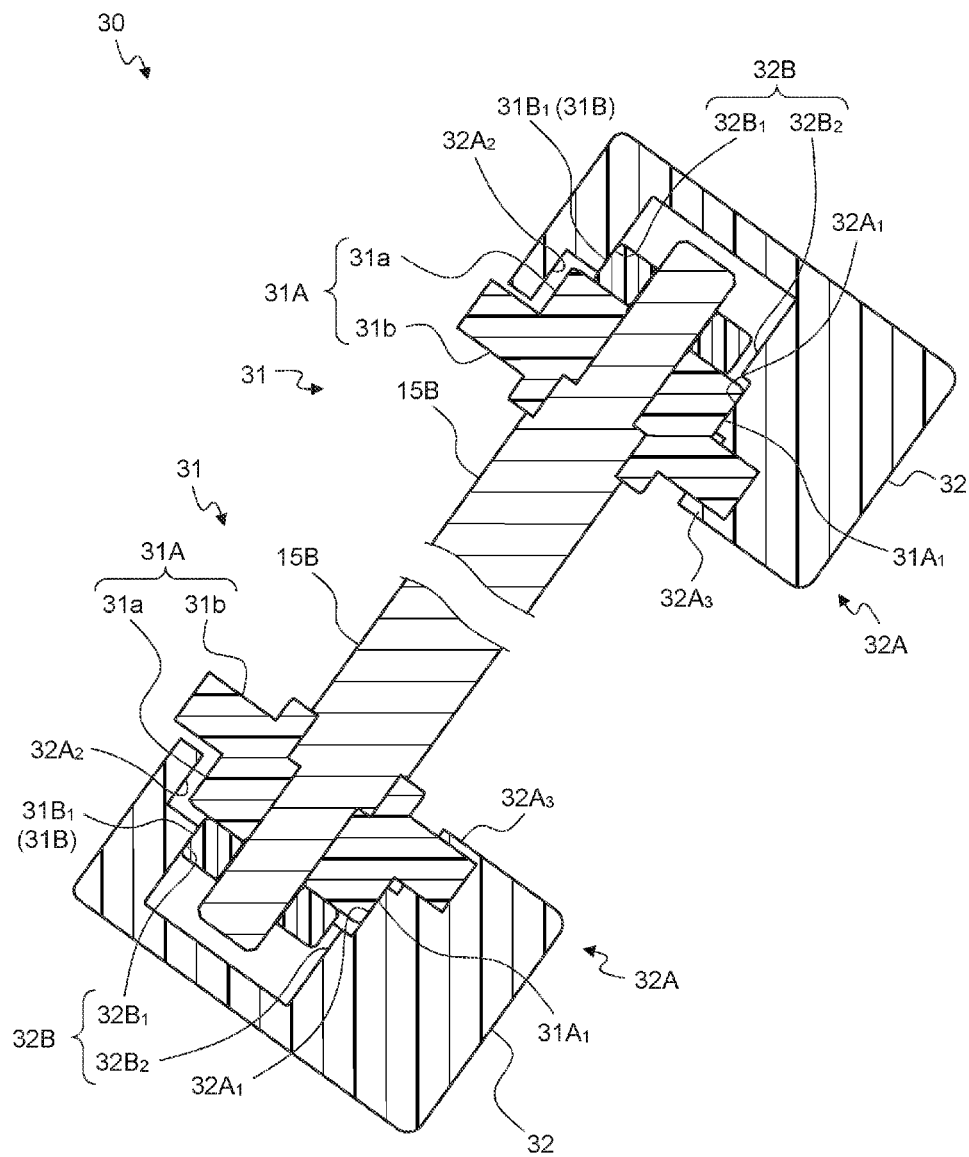
FIG. 12 is a cross-sectional view of the guide device taken along X-X line of FIG. 3 and Y-Y line of FIG. 4.
Figure 13:
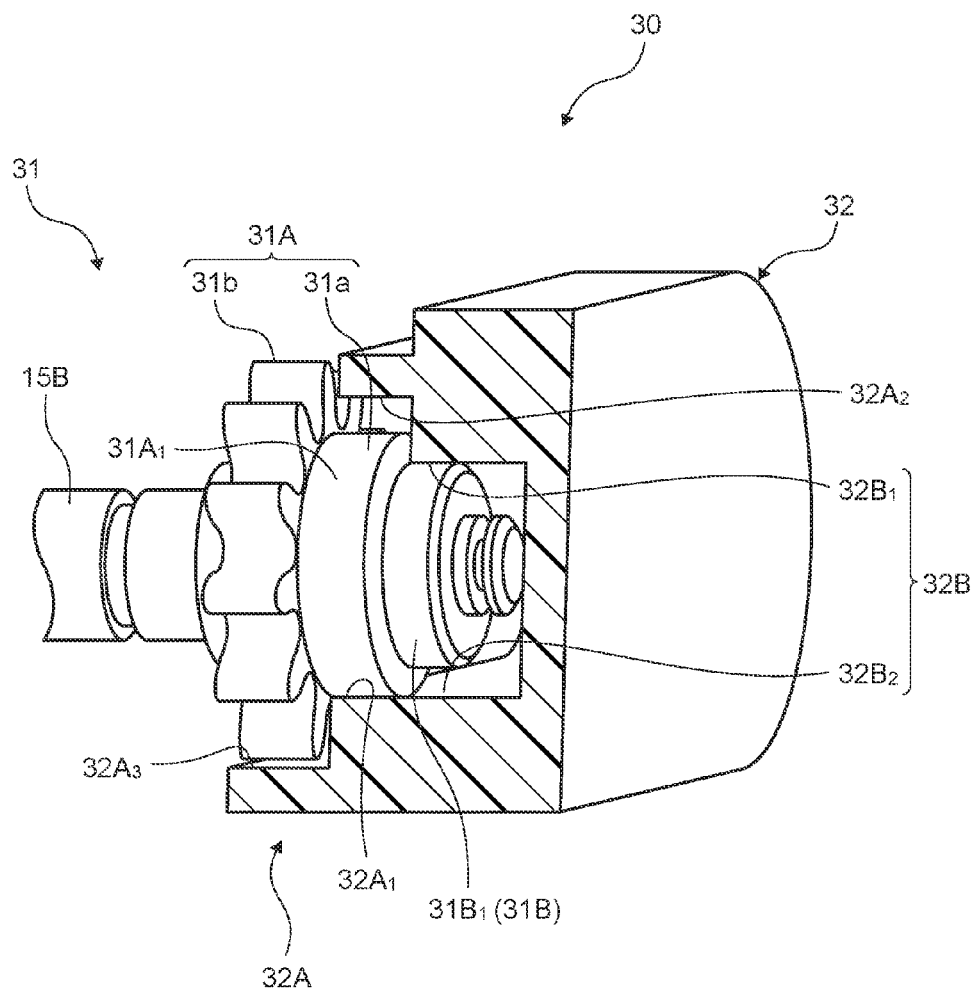
FIG. 13 is a perspective view for description of the guide device.

Specifically, the guide rail 32 guides the first rotating body 31A and the second rotating body 31B of the guided portion 31 in the extending direction while rolling the first rotating body 31A and the second rotating body 31B. A first guide surface $32A_1$ that comes into contact with the rolling contact surface $31A_1$ in the rolling portion 31a of the first rotating body 31A at one side in a radial direction of the first and second rotating bodies 31A and 31B and guides the first rotating body 31A while rolling the first rotating body 31A, and a second guide surface $32B_1$ that comes into contact with the rolling contact surface $31B_1$ of the second rotating body 31B at the other side in the radial direction and guides the second rotating body 31B while rolling the second rotating body 31B are provided in the guide rail 32 (FIG. 10 to FIG. 13). In other words, the guide rail 32 is configured to roll the first rotating body 31A along the first guide surface $32A_1$ and roll the second rotating body 31B along the second guide surface $32B_1$ while interposing the guided portion 31 in the radial direction of the first and second rotating bodies 31A and 31B by the first guide surface $32A_1$ and the second guide surface $32B_1$. FIG. 10 and FIG. 11 illustrate a third cover member 44 attached to the second support 41b of the skeleton member 41 between the respective guide rails 32. The third cover member 44 is a plate-shaped member formed along the arc-shaped guide portion 33 and the linear guide portion 34 of the guide rail 32, and is disposed on the vehicle lower side with respect to the respective guide rails 32.

The first guide surface $32A_1$ of this example is disposed to come into contact with the rolling contact surface $31A_1$ of the rolling portion 31a of the first rotating body 31A from the vehicle lower side. Meanwhile, the second guide surface $32B_1$ of this example is disposed to come into contact with the rolling contact surface $31B_1$ of the second rotating body 31B from the vehicle upper side. For example, the guide rail 32 of this example has a first guide rail portion 32A that guides the first rotating body 31A while rolling the first rotating body 31A, and the first guide surface $32A_1$ is provided on the vehicle lower side of the first guide rail portion 32A. In addition, the guide rail 32 has a second guide rail portion 32B that guides the second rotating body 31B while rolling the second rotating body 31B, and the second guide surface $32B_1$ is provided on the vehicle upper side of the second guide rail portion 32B. The first and second guide surfaces $32A_1$ and $32B_1$ are largely divided into the arc-shaped guide portion 33 and the linear guide portion 34 described above.

The first rotating body 31A is disposed such that the rolling portion 31a rolls while coming into contact with only the first guide surface $32A_1$. For example, the first guide rail portion 32A of this example has a facing wall surface $32A_2$ along the extending direction thereof (that is, a direction in which the first rotating body 31A is guided) at a position facing the first guide surface $32A_1$ and interposing the first rotating body 31A therebetween (that is, on the vehicle upper side). For this reason, the first guide rail portion 32A is formed such that a shortest distance between the first guide surface $32A_1$ and the facing wall surface $32A_2$ at each position in the extending direction thereof is larger than the outer diameter of the rolling portion 31a of the first rotating body 31A. In addition, the second rotating body 31B is disposed to roll while coming into contact with only the second guide surface $32B_1$. For example, the second guide rail portion 32B of this example has a facing wall surface $32B_2$ along the extending direction thereof (that is, a direction in which the second rotating body 31B is guided) at a position facing the second guide surface $32B_1$ and interposing the second rotating body 31B therebetween (that is, on the vehicle lower side). For this reason, the second guide rail portion 32B is formed such that a shortest distance between the second guide surface $32B_1$ and the facing wall surface $32B_2$ at each position in the extending direction thereof is larger than the outer diameter of the second rotating body 31B.

In this way, in the guide device 30 of the present embodiment, the first guide surface $32A_1$ and the second guide surface $32B_1$ of the guide rail 32 put the first rotating body 31A and the second rotating body 31B of the guided portion 31 therebetween in a radial direction of the first and second guide surfaces $32A_1$ and $32B_1$ at a point on the rolling contact surface $31A_1$ of the rolling portion 31a of the first rotating body 31A coming into contact with the first guide surface $32A_1$ and a point on the rolling contact surface $31B_1$ of the second rotating body 31B coming into contact with the second guide surface 32B$_1$. For this reason, the guide device 30 may suppress generation of backlash between the guided portion 31 and the guide rail 32. In addition, the guide device 30 is configured such that the rolling contact surface 31A$_1$ of the rolling portion 31a of the first rotating body 31A rolls along the first guide surface 32A$_1$ while coming into contact with only the first guide surface 32A$_1$, and is configured such that the rolling contact surface 31B$_1$ of the second rotating body 31B rolls along the second guide surface 32B$_1$ while coming into contact with only the second guide surface 32B$_1$. Thus, the first rotating body 31A and the second rotating body 31B may be guided along the first guide surface 32A$_1$ and second guide surface 32B$_1$ while the first rotating body 31A and the second rotating body 31B are rolled in a state in which backlash of the guided portion 31 with respect to the guide rail 32 is suppressed. Therefore, in the guide device 30, when the movable body 10 is fixed in the upright position P1 or the tilt position P2, and when the movable body 10 is shifted between the upright position P1 and the tilt position P2, it is possible to suppress generation of noise or vibration resulting from backlash between the guided portion 31 and the guide rail 32. Herein, in the vehicle display system 1, vibration is transmitted by an input from the outside (for example, vibration in association with an input from a road surface is transmitted through a vehicle body) or an operation of the driving device 20. However, in the guide device 30, even when such vibration is transmitted, generation of resonance in the guided portion 31 and the guide rail 32 may be suppressed since generation of backlash between the guided portion 31 and the guide rail 32 is suppressed. For this reason, the guide device 30 may suppress generation of noise or vibration in association with such resonance, and improve durability.

Herein, a rack portion 32A$_3$ is provided in the first guide rail portion 32A of this example. The rack portion 32A$_3$ is a rack gear, on which a plurality of teeth is formed, rolling the first rotating body 31A while meshing with the teeth of the gear portion 31b of the first rotating body 31A, and the teeth are provided at a predetermined pitch along an extending direction of the first guide rail portion 32A. The first rotating body 31A performs a rolling operation on the first guide surface 32A$_1$ of the rolling contact surface 31A$_1$ of the rolling portion 31a, and performs a rolling operation while meshing with the teeth of the rack portion 32A$_3$ along an extending direction thereof. For this reason, the rack portion 32A$_3$ is disposed on the same side as the first guide surface 32A$_1$ with respect to the first rotating body 31A so as not to hinder the rolling operation of the first rotating body 31A. In this example, the rack portion 32A$_3$ is disposed on the vehicle lower side. The rack portion 32A$_3$ is largely divided into the arc-shaped guide portion 33 and the linear guide portion 34 described above. In figures except for FIG. 13, the teeth of the rack portion 32A$_3$ are not illustrated for convenience.

The vehicle display system 1 may shift the movable body 10 only between the upright position P1 and the tilt position P2. However, in the present embodiment, the vehicle display system 1 is configured such that the movable body 10 may be shifted in the vehicle width direction. For this reason, the vehicle display system 1 includes another driving device (second driving device) 70 in charge of displacement of the movable body 10 in the vehicle width direction (FIG. 14 and FIG. 15) in addition to the driving device (first driving device) 20 in charge of displacement of the movable body 10 between the upright position P1 and the tilt position P2.

In this example, the movable body 10 is shifted between at least two fixed positions in the vehicle width direction. For example, in this example, the upright position P1 is set to a first fixed position P1 in the vehicle width direction, and a position shifted from the first fixed position P1 to the vehicle right side is set to a second fixed position P3 in the vehicle width direction (FIG. 16). In the movable body 10 of this example, the base member 13 and the holding member 14 are disposed not to relatively move in the vehicle width direction with respect to the skeleton member 41, and the frame 11 and the blocking member 12 are relatively moved in the vehicle width direction with respect to the base member 13 and the holding member 14.

A mechanism that implements relative movement in the vehicle width direction (a relative movement mechanism) includes a boss portion 12a provided on a rear surface of the blocking member 12, a through-hole 13a which is formed in the base member 13 and into which the boss portion 12a penetrates, and the screw member B screwed with a female screw portion (not illustrated) of the boss portion 12a (FIG. 17). The boss portion 12a is a tubular body (herein, a cylindrical body) vertically arranged toward the base member 13 side from the rear surface of the blocking member 12, and the female screw portion is formed inside the boss portion 12a. The through-hole 13a is extended at least by the movement amount of relative movement in a relative movement direction (that is, the vehicle width direction), and formed to have a width in a short direction slightly larger than an outer diameter of the boss portion 12a. An end portion of the boss portion 12a on a free end side protrudes to the holding member 14 side from the through-hole 13a. When the screw member B is screwed with the boss portion 12a, the base member 13 is attached to an integrated object of the frame 11 and the blocking member 12, and may relatively move in the vehicle width direction with respect to the integrated object. A plurality of relative movement mechanisms is provided in the movable body 10. In this example, four relative movement mechanisms are provided.

Figure 14:
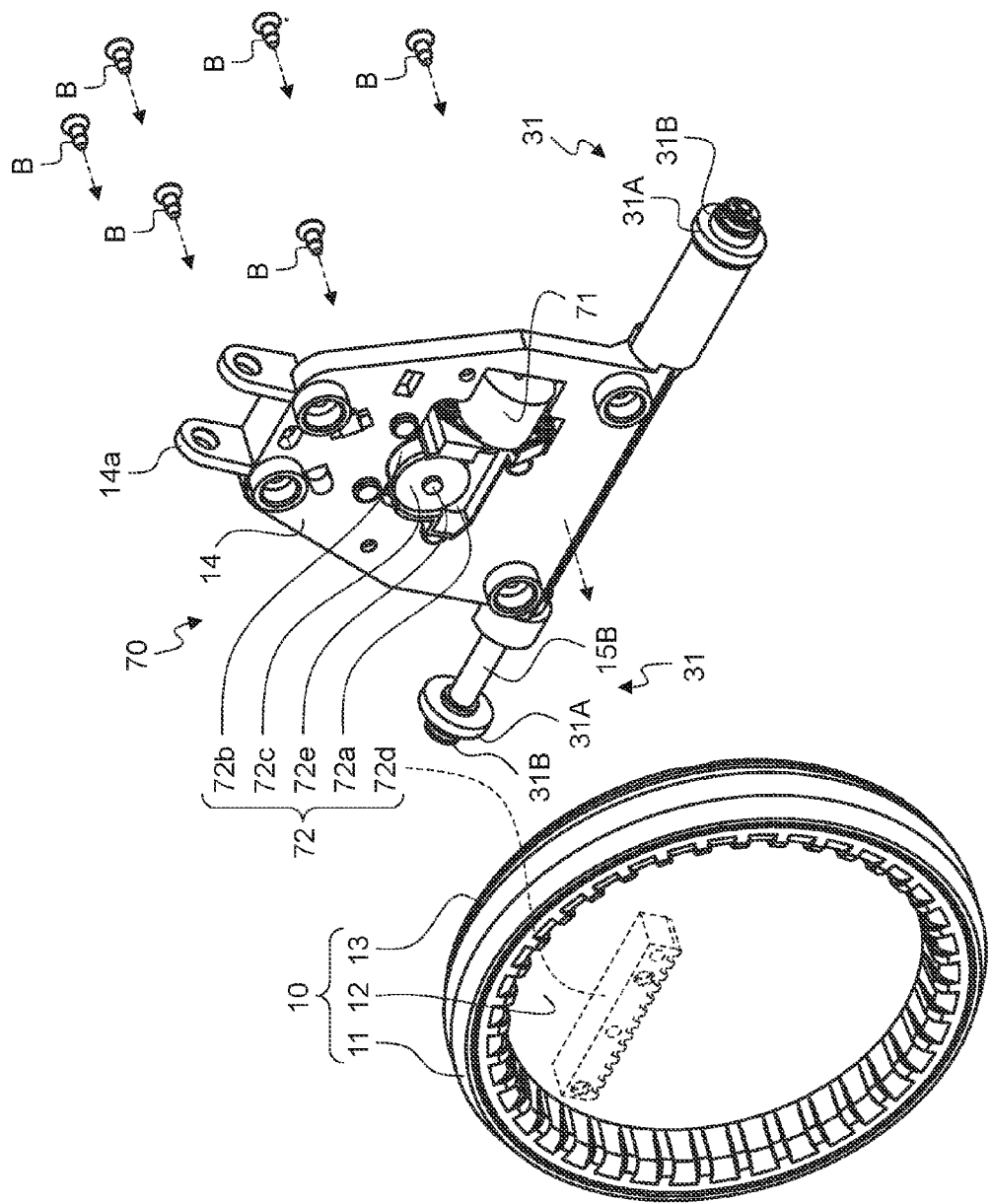
FIG. 14 is a front-view exploded perspective view illustrating a second driving device.

The second driving device 70 includes a power source 71 and a power transmission device 72 (FIG. 14). The second driving device 70 transmits power of the power source 71 to the movable body 10 as a driving force at the time of a shift operation between the first fixed position P1 and the second fixed position P3. A third driving force at the time of displacement from the first fixed position P1 to the second fixed position P3 and a fourth driving force, which is reverse to the third driving force, at the time of displacement from the second fixed position P3 to the first fixed position P1 are transmitted as the driving force to the movable body 10. The second driving device 70 is disposed between the movable body 10 (specifically the blocking member 12) and the holding member 14.

The power source 71 generates power serving as an origin of a driving force for shifting the movable body 10. In this example, an electric motor is used as the power source 71. The power source 71 is held by the holding member 14. The power source 71 is controlled by a drive controller. The drive controller may be an exclusive drive controller for the second driving device 70, or the drive controller 23 of the first driving device 20 may be used. In this example, an exclusive control function for the second driving device 70 is assigned to the drive controller 23 of the first driving device 20.

The power transmission device 72 has a motion direction conversion mechanism, and shifts the movable body 10 between the first fixed position P1 and the second fixed position P3 when power of the power source 71 is transmitted. For this reason, the power transmission device 72 converts power transmitted from the power source 71 into a driving force, and delivers the converted driving force to the movable body 10.

The power transmission device 72 of this example includes a crossed helical gear 72a, a helical gear 72b, a spur gear 72c, and a rack gear 72d (FIG. 14). The crossed helical gear 72a is coaxially installed with respect to an output shaft (not illustrated) of the power source 71, and rotates integrally with the output shaft. The helical gear 72b is meshed with the crossed helical gear 72a. The helical gear 72b is coaxially installed with respect to a rotating shaft 72e, and rotates integrally with the rotating shaft 72e. The rotating shaft 72e is disposed by aligning an axis direction thereof with a central axis of the movable body 10 (the frame 11, the blocking member 12, and the base member 13). The rotating shaft 72e is rotatably attached to the holding member 14 to be rotated around an axis. The spur gear 72c is coaxially attached to the rotating shaft 72e on the base member 13 side of the helical gear 72b, and rotates integrally with the rotating shaft 72e together with the helical gear 72b. The rack gear 72d is attached to the blocking member 12, and moves in the vehicle width direction integrally with the frame 11 and the blocking member 12. The rack gear 72d is meshed with the spur gear 72c by protruding to the holding member 14 side from the base member 13. For this reason, a through-hole 13b extended in the vehicle width direction is formed in the base member 13 so as not to hinder movement of the rack gear 72d in the vehicle width direction at the time of relative movement (FIG. 15). The rack gear 72d protrudes to the holding member 14 side through the through-hole 13b, and is meshed with the spur gear 72c at a protruding portion thereof.

The power transmission device 72 transmits a driving force in the vehicle width direction to the blocking member 12 when power of the power source 71 is transmitted. Therefore, in a case in which power of the power source 71 is controlled to shift the frame 11 and the blocking member 12 from the first fixed position P1 to the second fixed position P3 when the frame 11 and the blocking member 12 are at the first fixed position P1, the second driving device 70 transmits the third driving force directed to the vehicle right side to the blocking member 12 to relatively move the frame 11 and the blocking member 12 to the vehicle right side with respect to the base member 13 and the holding member 14. In this way, in the movable body 10, the frame 11 and the blocking member 12 are shifted to the second fixed position P3. In addition, in a case in which power of the power source 71 is controlled to shift the frame 11 and the blocking member 12 from the second fixed position P3 to the first fixed position P1 when the frame 11 and the blocking member 12 are at the second fixed position P3, the second driving device 70 transmits the fourth driving force directed to the vehicle left side to the blocking member 12 to relatively move the frame 11 and the blocking member 12 to the vehicle left side with respect to the base member 13 and the holding member 14. In this way, in the movable body 10, the frame 11 and the blocking member 12 are shifted to the first fixed position P1.

Herein, for example, an electric wire 74 is electrically connected to the power source 71 through a switch 71a (FIG. 7). In addition, the second driving device 70 moves together with the movable body 10 when the movable body 10 is shifted between the upright position P1 and the tilt position P2. For this reason, there is a possibility that the electric wire 74 may warp together with displacement of the movable body 10 between the upright position P1 and the tilt position P2 depending on a routing path.

In this regard, the electric wire 74 is held by the motion direction conversion member 62 at which a distance from the power source 71 does not change much due to the displacement, and movement of the electric wire 74 associated with the displacement is absorbed on a power source (secondary battery of the vehicle, etc.) side of this holding point. For example, a through-hole $62A_2$ penetrating the first motion direction conversion member 62A in an axis direction of the shaft member 63 or the through-hole $62A_1$ (the front-rear direction of the vehicle) is formed in the first motion direction conversion member 62A (FIG. 7). Further, a through-hole $62B_2$ penetrating the second motion direction conversion member 62B in the axis direction is formed in the second motion direction conversion member 62B (FIG. 7). The electric wire 74, which is drawn from the power source 71 side, passes through the through-hole $62B_2$ of the second motion direction conversion member 62B from the vehicle rear side, and then passes through the through-hole $62A_2$ of the first motion direction conversion member 62A from the vehicle rear side. Then, the electric wire 74 is drawn to the front of the vehicle (FIG. 9). In addition, the electric wire 74 is held by the motion direction conversion member 62. For example, taping, a clip, etc. may be used to hold the electric wire 74. In this way, the vehicle display system 1 of the present embodiment may suppress warping of the electric wire 74 between the power source 71 and the motion direction conversion member 62 when the movable body 10 is shifted between the upright position P1 and the tilt position P2. Therefore, the vehicle display system 1 may suppress a decrease in durability of the electric wire 74 due to warping. Further, the vehicle display system 1 may inhibit the electric wire 74 from coming into contact with a peripheral movable part at the time of displacement. Thus, from this point of view, the vehicle display system 1 may suppress a decrease in durability of the electric wire 74.

Further, the vehicle display system 1 of the present embodiment includes the display device 80 that displays information to be displayed such that the user inside the vehicle interior may recognize the information (FIG. 3 and FIG. 4). The display device 80 displays the information to be displayed such that the information is recognized by the user inside the vehicle interior in at least the inner region 11a of the frame 11. The display device 80 of this example forms a virtual image at a front surface side of the inner region 11a of the frame 11, and causes the user to recognize information to be displayed formed by the virtual image as though the information is displayed in the inner region 11a. For this reason, the display device 80 includes a display body 81, the semitransparent mirror (so-called half mirror) 82, a light source 83, and a display controller 84.

The display body 81 refers to an imaging/projection device that creates a display image related to information to be displayed, and projects incident light of the created display image onto the semitransparent mirror 82. The display body 81 is disposed on a vehicle interior inner side of the movable body 10 and in an upper part of the accommodation portion 101. The semitransparent mirror 82 is disposed by tilting the vehicle upper side to the vehicle front side on the vehicle lower side of the display body 81 and on the vehicle interior inner side of the movable body 10. The display image projected from the display body 81 penetrates the semitransparent mirror 82 to form a virtual image of the display image (information to be displayed) on the front surface side of the frame 11. For example, the light source 83 illuminates the frame 11, and is disposed on the vehicle interior inner side and the vehicle upper side of the movable body 10 in the upright position P1 and on the vehicle upper side of the movable body 10 in the tilt position P2.

For example, the display controller 84 causes the display body 81 to create a display image depending on a fixed position of the movable body 10 (that is, a display image of information to be displayed different for each fixed position of the movable body 10) and project the display image to display the information to be displayed such that the information is recognized by the user inside the vehicle interior in the inner region 11*a* of the frame 11. In addition, the display controller 84 may appropriately control the presence/absence of display of the information to be displayed in the upright position P1 (first fixed position P1), the tilt position P2, and the second fixed position P3. When the information to be displayed is not displayed, for example, the display controller 84 prohibits the display body 81 from creating and projecting the display image. Herein, the information to be displayed is not illustrated.

In addition, when the tilt position P2 corresponds to a position in which the inner region 11*a* of the frame 11 is directed to the vehicle upper side and the vehicle rear side as in this example, the display controller 84 displays the information to be displayed at least in the upright position P1 (first fixed position P1) and the tilt position P2. Meanwhile, when the tilt position P2 corresponds to a position in which the inner region 11*a* of the frame 11 is directed to the vehicle upper side, and the inner region 11*a* is difficult to recognize by the user, the display controller 84 displays the information to be displayed at least in the upright position P1 (first fixed position P1) and prohibits display of the information to be displayed in the tilt position P2. However, in this example, since the frame 11 is shifted in the vehicle width direction, the information to be displayed is displayed in the second fixed position P3.

Herein, a display body such as a liquid crystal display may be arranged in the inner region 11*a* of the frame 11 instead of the blocking member 12, and the display device 80 may directly display the information to be displayed in the inner region 11*a*.

As described above, the vehicle display system 1 of the present embodiment shifts the movable body 10 between the upright position P1 and the tilt position P2, and displays information to be displayed in the inner region 11*a* of the frame 11 of the movable body 10. In this way, the vehicle display system 1 provides visual stimulation to the user inside the vehicle interior, and may improve marketability.

Further, in the vehicle display system 1, when the movable body 10 is fixed in the upright position P1 or the tilt position P2, and when the movable body 10 is shifted between the upright position P1 and the tilt position P2, a sandwiched state with respect to the first rotating body 31A and the second rotating body 31B of the guided portion 31 by the first guide surface 32A$_1$ and the second guide surface 32B$_1$ of the guide rail 32 may be maintained. Thus, it is possible to continuously suppress backlash of the guided portion 31 with respect to the guide rail 32. Therefore, when the movable body 10 is fixed in the upright position P1 or the tilt position P2, and when the movable body 10 is shifted between the upright position P1 and the tilt position P2, the vehicle display system 1 may shift the movable body 10 through a smooth operation, and suppress generation of noise or vibration resulting from backlash between the guided portion 31 and the guide rail 32. Herein, in the vehicle display system 1, vibration is transmitted by an input from the outside (for example, vibration in association with an input from the road surface is transmitted through the vehicle body) or an operation of the driving device 20. However, in the vehicle display system 1, even when such vibration is transmitted, generation of resonance in the guided portion 31 and the guide rail 32 may be suppressed since generation of backlash between the guided portion 31 and the guide rail 32 is suppressed. For this reason, the vehicle display system 1 may suppress generation of noise or vibration in association with such resonance, and improve durability. In this way, the vehicle display system 1 may perform a smooth shift operation of the movable body 10 between the upright position P1 and the tilt position P2, and suppress generation of useless noise or vibration. Thus, marketability may be further improved. In addition, the vehicle display system 1 may improve durability. Thus, from this point of view, marketability may be improved.

In addition, the vehicle display system 1 may shift the movable body 10 in the vehicle width direction between the first fixed position P1 (upright position P1) and the second fixed position P3, and display information to be displayed in the inner region 11*a* of the frame 11 of the movable body 10. Therefore, the vehicle display system 1 may provide further visual stimulation to the user inside the vehicle interior, and may further improve marketability.

Incidentally, in the vehicle display system 1 of the present embodiment, the gear portion 31*b* is provided in the first rotating body 31A, the rack portion 32A$_3$ is provided in the guide rail 32, and the teeth thereof are meshed with each other. In addition, in the vehicle display system 1, when the movable body 10 is shifted between the upright position P1 and the tilt position P2, backlash between the guided portion 31 and the guide rail 32 is suppressed. Thus, the guided portion 31 may be guided along the guide rail 32 while maintaining a meshed state between the gear portion 31*b* and the rack portion 32A$_3$ as designed. For this reason, in the vehicle display system 1, when the movable body 10 is shifted between the upright position P1 and the tilt position P2, it is possible to suppress backlash along the axis direction of the second rotating shaft 15B (that is, the vehicle width direction) between the guided portion 31 and the guide rail 32. In other words, in the vehicle display system 1, when the movable body 10 is shifted between the upright position P1 and the tilt position P2, it is possible to suppress generation of backlash of the movable body 10 in the vehicle width direction. Therefore, from this point of view, a smooth shift operation of the movable body 10 is allowed in the vehicle display system 1, and marketability may be improved.

A vehicle display system according to the embodiments shifts a movable body between an upright position and a tilt position, and displays information to be displayed in an inner region of a frame of the movable body. Thus, the vehicle display system provides visual stimulation to a user inside a vehicle interior, and may improve marketability. Further, in the vehicle display system, when the movable body is fixed in the upright position or the tilt position, and when the movable body is shifted between the upright position and the tilt position, a sandwiched state with respect to a first rotating body and a second rotating body of a guided portion by a first guide surface and a second guide surface of a guide rail may be maintained. Thus, it is possible to continuously suppress backlash of the guided portion with respect to the guide rail. Therefore, when the movable body is fixed in the upright position or the tilt position, and when the movable body is shifted between the upright position and the tilt position, the vehicle display system may suppress generation of useless noise or vibration. Thus, marketability may be further improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display system comprising:
a movable body including a frame having an annular shape or a non-annular shape in which a portion of the annular shape is missing, the frame being allowed to shift between at least two fixed positions corresponding to an upright position in which an inner region of the frame is directed at least to a vehicle rear side and a tilt position in which the inner region is directed to at least a vehicle upper part on a vehicle rear side and a vehicle lower side relative to the upright position;
a first holding body that holds one of a vehicle upper side and a vehicle lower side of the movable body in the upright position;
a second holding body that holds the other one of the vehicle upper side and the vehicle lower side;
a display device that displays information to be displayed such that the information is recognized by a user inside a vehicle interior in the inner region of the frame;
a driving device that transmits a driving force at a time of a shift operation of the movable body between the upright position and the tilt position based on power of a power source to the first holding body, the driving force corresponding to a first driving force at a time of shifting the movable body from the upright position to the tilt position and a second driving force at a time of shifting the movable body from the tilt position to the upright position, the second driving force being reverse to the first driving force; and
a guide device that guides the shift operation of the movable body between the upright position and the tilt position by guiding a guided portion provided in the second holding body along a guide rail, wherein
the guided portion includes a rotating shaft and first and second rotating bodies disposed coaxially with the rotating shaft, rolling contact surfaces rolling along the guide rail being formed on the first and second rotating bodies,
the guide rail includes a first guide surface that comes into contact with the rolling contact surface of the first rotating body at one side in a radial direction of the first and second rotating bodies and guides the first rotating body while rolling the first rotating body, and a second guide surface that comes into contact with the rolling contact surface of the second rotating body at the other side in the radial direction and guides the second rotating body while rolling the second rotating body,
the first rotating body is disposed to roll while coming into contact with only the first guide surface, and
the second rotating body is disposed to roll while coming into contact with only the second guide surface.

2. The vehicle display system according to claim 1, wherein
the guide rail shifts the movable body from the upright position to the tilt position by guiding the guided portion such that a first held portion of the movable body held by the first holding body moves in a direction of the first driving force when the first driving force acts on the first holding body, and shifts the movable body from the tilt position to the upright position by guiding the guided portion such that the first held portion moves in a direction of the second driving force when the second driving force acts on the first holding body.

3. The vehicle display system according to claim 1, wherein
the first rotating body includes a rolling portion having the rolling contact surface, and a gear portion coaxial with the rolling portion, and
the guide rail has a rack portion on which a plurality of teeth is formed, the rack portion rolling the first rotating body while meshing with teeth of the gear portion.

4. The vehicle display system according to claim 2, wherein
the first rotating body includes a rolling portion having the rolling contact surface, and a gear portion coaxial with the rolling portion, and
the guide rail has a rack portion on which a plurality of teeth is formed, the rack portion rolling the first rotating body while meshing with teeth of the gear portion.

* * * * *